United States Patent
Van Der Linden et al.

(10) Patent No.: US 9,202,219 B2
(45) Date of Patent: Dec. 1, 2015

(54) SYSTEM AND METHOD TO MERGE PAY-FOR-PERFORMANCE ADVERTISING MODELS

(75) Inventors: Sean Van Der Linden, Berkeley, CA (US); Scott Faber, San Francisco, CA (US); Mark Halstead, Auckland (NZ); Ebbe Altberg, Mill Valley, CA (US)

(73) Assignee: YELLOWPAGES.COM LLC, Tucker, GA (US)

( * ) Notice: Subject to any disclaimer, the term of this patent is extended or adjusted under 35 U.S.C. 154(b) by 1842 days.

(21) Appl. No.: 11/077,516

(22) Filed: Mar. 9, 2005

(65) Prior Publication Data

US 2006/0184417 A1  Aug. 17, 2006

Related U.S. Application Data

(60) Provisional application No. 60/656,637, filed on Feb. 25, 2005.

(51) Int. Cl.
*G06Q 30/00* (2012.01)
*G06Q 30/02* (2012.01)
*G05B 19/418* (2006.01)

(52) U.S. Cl.
CPC ............ *G06Q 30/02* (2013.01); *G06Q 30/0247* (2013.01); *G06Q 30/0267* (2013.01); *G06Q 30/0275* (2013.01)

(58) Field of Classification Search
CPC .............. G06Q 30/0267; G06Q 30/02; G06Q 30/0269; G06Q 30/08; G06Q 30/0207; G06Q 30/0242; G06Q 30/0247; G06Q 30/0251; G06Q 30/0255; G06Q 30/0257; G06Q 30/0261; G06Q 30/0263; G06Q 30/0266

USPC .......................................................... 705/14
See application file for complete search history.

(56) References Cited

U.S. PATENT DOCUMENTS 4,313,035 A  1/1982 Jordan et al.
4,577,065 A  3/1986 Frey et al.
(Continued)

FOREIGN PATENT DOCUMENTS

AU  699785  5/1995
EP  1489529  12/2004
(Continued)

OTHER PUBLICATIONS

"Say hello to voice portals". Author Swartz, Nikki. Publication title Wireless Review. vol. 18. Issue 3. pp. 58-60. Feb. 1, 2001.*
(Continued)

*Primary Examiner* — Victoria Vanderhorst
(74) *Attorney, Agent, or Firm* — Alston & Bird LLP

(57) ABSTRACT

Methods and apparatuses for merging different types of pay for performance advertisements. In one embodiment, a method includes: determining an indicator of potential revenue for a party from price information of a list of entities, which includes first price information for a first type of advertisements and second price information for a second type of advertisements; and sorting the list of entities based at least partially on the indicator of potential revenue. In one embodiment, a method includes: converting price information for an advertisement of a first type to equivalent price information for a second type of advertisements. In one embodiment, a method includes: determining automatically, based on a call bid amount for a pay per call advertisement, a click bid amount for a pay per click advertisement to provide a phone number of the pay per call advertisement.

12 Claims, 20 Drawing Sheets

(56) References Cited

U.S. PATENT DOCUMENTS

| | | |
|---|---|---|
| 4,631,428 A | 12/1986 | Grimes |
| 4,645,873 A | 2/1987 | Chomet |
| 4,677,434 A | 6/1987 | Fascenda |
| 4,723,283 A | 2/1988 | Nagasawa et al. |
| 4,751,669 A | 6/1988 | Sturgis et al. |
| 4,752,675 A | 6/1988 | Zetmeir |
| 4,847,890 A | 7/1989 | Solomon et al. |
| 5,058,152 A | 10/1991 | Solomon et al. |
| 5,148,474 A | 9/1992 | Haralambopoulos et al. |
| 5,155,743 A | 10/1992 | Jacobs |
| 5,319,542 A | 6/1994 | King, Jr. et al. |
| 5,325,424 A | 6/1994 | Grube |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,448,625 A | 9/1995 | Lederman |
| 5,453,352 A | 9/1995 | Tachibana |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,555,298 A | 9/1996 | Jonsson |
| 5,557,677 A | 9/1996 | Prytz |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,608,786 A | 3/1997 | Gordon |
| 5,615,213 A | 3/1997 | Griefer |
| 5,619,148 A | 4/1997 | Guo |
| 5,619,570 A | 4/1997 | Tsutsui |
| 5,619,725 A | 4/1997 | Gordon |
| 5,619,991 A | 4/1997 | Sloane |
| 5,634,012 A | 5/1997 | Stefik et al. |
| 5,638,432 A | 6/1997 | Wille et al. |
| 5,675,734 A | 10/1997 | Hair |
| 5,694,549 A | 12/1997 | Carlin et al. |
| 5,701,419 A | 12/1997 | McConnell |
| 5,710,887 A | 1/1998 | Chelliah et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,734,961 A | 3/1998 | Castille |
| 5,740,231 A | 4/1998 | Cohn et al. |
| 5,745,681 A | 4/1998 | Levine et al. |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,793,851 A | 8/1998 | Albertson |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kania et al. |
| 5,835,896 A | 11/1998 | Fisher et al. |
| 5,842,212 A | 11/1998 | Ballurio et al. |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| 5,870,744 A | 2/1999 | Sprague |
| 5,878,130 A | 3/1999 | Amdrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,907,677 A | 5/1999 | Glenn et al. |
| 5,911,132 A | 6/1999 | Sloane |
| 5,914,951 A | 6/1999 | Bentley et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,946,646 A | 8/1999 | Schena et al. |
| 5,960,416 A | 9/1999 | Block |
| 5,974,141 A | 10/1999 | Saito |
| 5,974,398 A | 10/1999 | Hanson et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,999,609 A | 12/1999 | Nishimura |
| 5,999,611 A | 12/1999 | Tatchell et al. |
| 6,006,197 A | 12/1999 | d-Eon et al. |
| 6,011,794 A | 1/2000 | Mordowitz et al. |
| 6,014,644 A | 1/2000 | Erickson |
| 6,026,087 A | 2/2000 | Mirashrafi et al. |
| 6,026,148 A | 2/2000 | Dworkin et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardener et al. |
| 6,130,933 A | 10/2000 | Miloslavsky |
| 6,144,670 A | 11/2000 | Sponaugle et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,188,673 B1 | 2/2001 | Bauer et al. |
| 6,188,761 B1 | 2/2001 | Dickerman et al. |
| 6,192,050 B1 | 2/2001 | Stovall |
| 6,199,096 B1 | 3/2001 | Mirashrafi et al. |
| 6,212,192 B1 | 4/2001 | Mirashrafi et al. |
| 6,223,165 B1 | 4/2001 | Lauffer |
| 6,230,287 B1 | 5/2001 | Pinard et al. |
| 6,233,566 B1 | 5/2001 | Levine et al. |
| 6,243,684 B1 | 6/2001 | Stuart et al. |
| 6,259,774 B1 | 7/2001 | Miloslavsky |
| 6,269,336 B1 | 7/2001 | Ladd et al. |
| 6,269,361 B1 | 7/2001 | Davis et al. |
| 6,292,799 B1 | 9/2001 | Peek et al. |
| 6,298,056 B1 | 10/2001 | Pendse |
| 6,301,342 B1 | 10/2001 | Ander et al. |
| 6,304,637 B1 | 10/2001 | Mirashrafi et al. |
| 6,310,941 B1 | 10/2001 | Crutcher et al. |
| 6,314,402 B1 | 11/2001 | Monaco et al. |
| 6,385,583 B1 | 5/2002 | Ladd et al. |
| 6,393,117 B1 | 5/2002 | Trell |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,430,276 B1 | 8/2002 | Bouvier et al. |
| 6,434,527 B1 | 8/2002 | Horvitz |
| 6,463,136 B1 | 10/2002 | Malik |
| 6,470,079 B1 | 10/2002 | Benson |
| 6,470,317 B1 | 10/2002 | Ladd et al. |
| 6,484,148 B1 | 11/2002 | Boyd |

(56) References Cited

U.S. PATENT DOCUMENTS

| | | |
|---|---|---|
| 6,493,437 B1 | 12/2002 | Olshansky |
| 6,493,671 B1 | 12/2002 | Ladd et al. |
| 6,493,673 B1 | 12/2002 | Ladd et al. |
| 6,510,417 B1 | 1/2003 | Woods et al. |
| 6,523,010 B2 | 2/2003 | Lauffer |
| 6,529,878 B2 | 3/2003 | De Rafael et al. |
| 6,539,359 B1 | 3/2003 | Ladd et al. |
| 6,546,372 B2 | 4/2003 | Lauffer |
| 6,549,889 B2 | 4/2003 | Lauffer |
| 6,560,576 B1 | 5/2003 | Cohen et al. |
| 6,606,376 B1 | 8/2003 | Trell |
| 6,625,595 B1 | 9/2003 | Anderson et al. |
| 6,636,590 B1 | 10/2003 | Jacob et al. |
| 6,658,389 B1 | 12/2003 | Alpdemir |
| 6,757,364 B2 | 6/2004 | Newkirk |
| 6,757,710 B2 | 6/2004 | Reed |
| 6,836,225 B2 | 12/2004 | Lee et al. |
| 6,968,174 B1 | 11/2005 | Trandal et al. |
| 6,978,270 B1 | 12/2005 | Carty et al. |
| 7,062,453 B1 | 6/2006 | Clarke |
| 7,085,745 B2 | 8/2006 | Klug |
| 7,373,599 B2 * | 5/2008 | McElfresh et al. ........... 715/210 |
| 7,698,183 B2 | 4/2010 | Faber et al. |
| 7,886,067 B2 | 2/2011 | Krassner et al. |
| 7,979,308 B2 | 7/2011 | Ho et al. |
| 8,027,878 B2 | 9/2011 | Wong et al. |
| 8,027,898 B2 | 9/2011 | Faber et al. |
| 2001/0032247 A1 | 10/2001 | Kanaya |
| 2001/0036822 A1 | 11/2001 | Mead et al. |
| 2001/0037283 A1 | 11/2001 | Mullaney |
| 2001/0048737 A1 | 12/2001 | Goldberg et al. |
| 2002/0003867 A1 | 1/2002 | Rothschild et al. |
| 2002/0004735 A1 | 1/2002 | Gross |
| 2002/0029241 A1 | 3/2002 | Yokono et al. |
| 2002/0038233 A1 | 3/2002 | Shubov et al. |
| 2002/0065959 A1 | 5/2002 | Kim et al. |
| 2002/0077891 A1 | 6/2002 | Castle et al. |
| 2002/0077930 A1 | 6/2002 | Trubey et al. |
| 2002/0087565 A1 | 7/2002 | Hoekman et al. |
| 2002/0095331 A1 | 7/2002 | Osmar et al. |
| 2002/0107697 A1 | 8/2002 | Jensen |
| 2002/0120554 A1 | 8/2002 | Vega |
| 2002/0133570 A1 | 9/2002 | Michel |
| 2002/0133571 A1 | 9/2002 | Jacob et al. |
| 2002/0160766 A1 | 10/2002 | Portman et al. |
| 2002/0173319 A1 | 11/2002 | Fostick |
| 2002/0191762 A1 | 12/2002 | Benson |
| 2002/0193094 A1 | 12/2002 | Lawless et al. |
| 2003/0043981 A1 | 3/2003 | Lurie et al. |
| 2003/0046161 A1 | 3/2003 | Kamangar et al. |
| 2003/0135460 A1 | 7/2003 | Talegon |
| 2003/0149622 A1 * | 8/2003 | Singh et al. ........... 705/14 |
| 2003/0220837 A1 | 11/2003 | Asayama |
| 2003/0220866 A1 | 11/2003 | Pisaris-Henderson |
| 2003/0223565 A1 * | 12/2003 | Montemer ........... 379/218.01 |
| 2003/0225682 A1 | 12/2003 | Montemer |
| 2004/0006511 A1 | 1/2004 | Montemer |
| 2004/0010518 A1 | 1/2004 | Montemer |
| 2004/0023644 A1 | 2/2004 | Montemer |
| 2004/0039640 A1 | 2/2004 | Koppelman et al. |
| 2004/0096110 A1 | 5/2004 | Yogeshwar et al. |
| 2004/0103024 A1 * | 5/2004 | Patel et al. ........... 705/14 |
| 2004/0162757 A1 | 8/2004 | Pisaris-Henderson |
| 2004/0199422 A1 | 10/2004 | Napier et al. |
| 2004/0204997 A1 | 10/2004 | Blaser et al. |
| 2004/0225562 A1 | 11/2004 | Turner |
| 2004/0234049 A1 | 11/2004 | Melideo |
| 2004/0234064 A1 | 11/2004 | Melideo |
| 2004/0236441 A1 | 11/2004 | Melideo |
| 2004/0249709 A1 | 12/2004 | Donovan et al. |
| 2004/0254859 A1 | 12/2004 | Aslanian, Jr. |
| 2004/0258048 A1 | 12/2004 | Melideo |
| 2004/0260413 A1 | 12/2004 | Melideo |
| 2005/0010795 A1 | 1/2005 | Tagawa et al. |
| 2005/0021744 A1 | 1/2005 | Haitsuka et al. |
| 2005/0033641 A1 | 2/2005 | Jha et al. |
| 2005/0048961 A1 | 3/2005 | Ribaudo et al. |
| 2005/0065811 A1 | 3/2005 | Chu et al. |
| 2005/0080878 A1 | 4/2005 | Cunningham et al. |
| 2005/0096980 A1 | 5/2005 | Koningstein |
| 2005/0097204 A1 * | 5/2005 | Horowitz et al. ........... 709/223 |
| 2005/0119957 A1 | 6/2005 | Faber et al. |
| 2005/0149396 A1 * | 7/2005 | Horowitz et al. ........... 705/14 |
| 2005/0203796 A1 | 9/2005 | Anand et al. |
| 2005/0203799 A1 | 9/2005 | Faber et al. |
| 2005/0209874 A1 | 9/2005 | Rossini |
| 2005/0220289 A1 | 10/2005 | Reding |
| 2005/0289026 A1 | 12/2005 | Dunn et al. |
| 2006/0004627 A1 * | 1/2006 | Baluja ........... 705/14 |
| 2006/0026061 A1 * | 2/2006 | Collins ........... 705/14 |
| 2006/0069610 A1 | 3/2006 | Rossini |
| 2006/0095343 A1 | 5/2006 | Clark et al. |
| 2006/0136310 A1 | 6/2006 | Gonen et al. |
| 2006/0149624 A1 | 7/2006 | Baluja et al. |
| 2006/0173915 A1 * | 8/2006 | Kliger ........... 707/104.1 |
| 2006/0200380 A1 | 9/2006 | Ho et al. |
| 2006/0247999 A1 | 11/2006 | Gonen et al. |
| 2007/0174124 A1 | 7/2007 | Zagofsky et al. |
| 2007/0192300 A1 | 8/2007 | Reuther et al. |
| 2007/0269038 A1 | 11/2007 | Gonen et al. |
| 2008/0301190 A1 | 12/2008 | Lockhart et al. |
| 2008/0313277 A1 | 12/2008 | Altberg et al. |
| 2009/0157593 A1 | 6/2009 | Hayashi et al. |
| 2010/0017266 A1 | 1/2010 | Faber et al. |
| 2011/0264517 A1 | 10/2011 | Ho |

FOREIGN PATENT DOCUMENTS

| | | |
|---|---|---|
| GB | 2329046 A | 10/1999 |
| JP | 409233441 A | 9/1997 |
| JP | 409319812 A | 12/1997 |
| WO | WO 97/05733 | 2/1997 |
| WO | WO 98/02835 | 1/1998 |
| WO | WO 98/04061 | 1/1998 |
| WO | WO 98/13765 | 4/1998 |
| WO | WO 98/38558 | 9/1998 |
| WO | WO 02/44870 | 6/2002 |
| WO | PCT/US01/51181 | 3/2003 |
| WO | 03030507 | 4/2003 |
| WO | 2008052083 | 5/2008 |

OTHER PUBLICATIONS

U.S. Appl. No. 09/596,466, filed Jun. 19, 2000, Agdeppa, Hector A.
U.S. Appl. No. 60/198,642, filed Apr. 20, 2000, Rothschild et al.
U.S. Appl. No. 60/471,535, filed May 19, 2003, Melideo.
Abhaya Asthana and Paul Krzyzanowski, "A Small Domain Communications System for Personalized Shopping Assistance," Proceedings of ICPWC'94, Publication No. 0-7803-1996-6/94,IEEE, 1994, pp. 199-203.
Amir Herzberg, et al., "MiniPay: Charging Per Click on the Web," Computer Networks and ISDN Systems 29, (Sep. 1997) vol. 29, pp. 939-951.
Answers.com Web Page (www.answers.com).
"Applying Technology News," Accounting Technology, p. 14 (Feb./Mar. 1997).
Aspect Telecomm: Aspect Integrates the Web into the Call Center, M2 Presswire, Aug. 1996.
Barbara Jarvie, "Company Devoted to Hot-Line Support", Computer Reseller News, Oct. 21, 1991, p. 48.
Big Green Blog: Jan. 2005 Archives, Feb. 21, 2006.
Caring for Customers: Real-Time text chat and telephony provide personalized customer support and turn queries into sales leads, Internet World Media, Sep. 1999.
Chris Ott, "Making Good on the Information Economy". Denver Business Journal, Dec. 17, 1999, p. 27.
Christina Wood, "Hidden Cost of Tech Support", PC World, May 1995, pp. 143-152 & p. 156.
Collett, Stacey & Julie King, "Why Online Browsers Don't Become Buyers," Computerworld, vol. 33, No. 48, p. 14 (Nov. 1999).
"Connecting to On-Line Car Shoppers: Auto Sellers Use Netcall Internet Call-Button Technology to Turn Clicks into Interactive Sales", Business Wire, p. 4089., Jul. 1999.

(56) References Cited

OTHER PUBLICATIONS

Cynthia Hodgson, "Online Expert Databases & Services", Econtent, Dec. 1999, p. 48-53.
Davey, Tom, "Wheeling and Dealing Online", PC Week, vol. 13, No. 45, pp. 1, 129., Nov. 1996.
E.J. Addeo, A.B. Dayao, A.D. Gelman and V.F. Massa, "An Experimental Multi-Media Bridging System," Frontiers in Computer Communications Technology, Computer Communications Review, vol. 17, No. 5, Aug. 11-13, 1987, pp. 236-242.
Edith Herman, "US Courts to Launch First Federal 900 Service," Federal Computer Week, Sep. 28, 1992, p. 8.
Ellen Greenbalt, "Have you ever wondered . . . ", Datamation, Oct. 1997, p. 12.
EXP.com Web Site at www.exp.com/.
"Expertcity.com Launches Premier Online Marketplace for Expert Services," PR Newswire (Aug. 1999).
For Telesphere's Clients, Dial '1-900-TUF LUCK', Business Week, Sep. 9, 1991, 88.
Franco Mercalli, et al., "TheESSAI Teleshopping System: An Example of Broadband Multimedia Application," Publication No. 0-7803-1820-X/94, IEEE, pp. 572-576 (1994).
Gregory Dalton, "Rent-An-Expert On the Web," Information Week p. 75 (Sep. 6, 1999).
Healey, Jon, "From A to Z, You Can Sell Advice Online." Retrieved from http://www.mercurycenter.com on Oct. 24, 2000, published on Nov. 7, 1999.
Infomarkets.com Web Site (www.infomarkets.com).
Information about Expertcity.com retrieved from the Internet [http://www.expertcity.com] on Nov. 6, 2000.
Information about Expertcity.com retrieved from the Internet [URL:http://www.expertcity.com] on Apr. 9, 2000.
Information, Bid and Asked, Forbes, Aug. 20, 1990, 92.
Ingenio Press Archives for 2004, www.ingenio.com, Feb. 21, 2006.
Intellect Exchange Web Site (www.intellectexchange.com).
"Introducing 1-800-FREE411: First Nationwide Free Telephone Directory Assistance Service" Jingle Networks, Inc., Huntington Beach, Calif., Sep. 20, 2005.
ISDN Tutorial: Definitions, http://www.ralphb.net/ISDN/defs.html (Apr. 21, 2000).
ISDN Tutorial:Interfaces, http://www.ralphb.net/ISDN/ifaces.html, printed on Apr. 21, 2000.
J. Sairamesh, et al., "NetBazaar: Networked Electronic Markets for Trading Computation and Information Services", Research and Advanced Technology for Digital Libraries, Second European Conference, ECDL 1998, pp. 839-856 (Sep. 21-23, 1998).
J.W.R. Griffiths, et al., "Multimedia Communication in a Medical Environment", IEEE 1991 Singapore I.C. on Networks, p. 166 (8 pgs.).
"Jambo Launches to Connect People and businesses From the Internet to the Phone", Agoura Hills, Calif. May 3, 2005.
"Jambo Names Netzero Co-founder Stacy Haitsuka to New Post of Chief Information Officer", Agoura Hills, Calif., Jul. 5, 2005.
"Jambo Receives $5 Million in Financiing from Kline Hawkes & Co., Westlake Venture Partners, Others", Agoura Hills, Calif., Oct. 17, 2005.
Jeff Pelline, "Net Firm to Connect Users by Phone," CNET News.com [retrieved from http://new.cnet.com] (Oct. 24, 2001) published Nov. 8, 1999.
Joann M. Wasik, "Information for Sale: Commercial Digital Reference and AskA Service", Virtual Reference Desk, Sep. 20, 1999, at www. vrd.org/AskA/commAskA.html.
John Robinson, "Attachmate Ready to Answer Net Questions", Network World, Apr. 8, 1996, p. 37.
Joseph Menn, "An Expert? There's Now a Home for You on the Internet", Los Angeles Times (retrieved from http://denverpost.com on Oct. 24, 2001).
*Keen.com, Inc.* v. *InfoRocket.com, Inc.,* Complaint for Patent Infringement, Trade Dress Infringement and Unfair Competition; Demand for Jury Trial filed Aug. 31, 2001, pp. 1-8 plus 17 pgs. of attachments.
*Keen.com, Inc.* v. *InfoRocket.com, Inc.,* Preliminary Injunction Hearing, pp. 286-289 (Jan. 8, 2002).
Keen.com Feb. 4, 2006.
Keen.com Plans Web Service Allowing Customers to Hold Private Phone Chats, Don Clark, Wall Street Journal, Nov. 8, 1999.
Keen.com raises $60 Million from Prestigious . . . , Business Wire, Jan. 11, 2000.
"Keen.com™ Launches First Live Answer Community™, Connects People with Information to Share Over Their Standard Telephone", Press Release [retrieved from http://keen.com] (Oct. 24, 2000), published Nov. 8, 1999.
Kiyoshi Kabeya, Akihiro Tomihisa and Sueharu Miyahara, "A New Teleconsultation Terminal System Using ISDN," NTT Review, vol. 3, No. 4, Jul. 1991, pp. 37-43.
L. F. Ludwig and D. F. Dunn, "Laboratory for Emulation and Study of Integrated and Coordinated Media Communication," Conference on Office Communication Systems, Mar. 23-25, 1988, Sponsored by ACM SIGOIS and IEEECS TC-OA in cooperation with IFIP W.G. 8.4, pp. 283-291.
Linda Littleton, "Meet the Shadowy Future," Proceedings of ACM SIGUCCS User Services Conference XXII Ypsilanti, Michigan Oct. 16-19, 1994, pp. 205-210.
"Lucent Technology and Netscape Team to Deliver Lucent Ecommerce Solutions," Business Wire, Sep. 1998.
Masahiko Hase, Shuji Kawakubo and Mineo Shoman, "Advanced Videophone System Using Synchronized Video Filing Equipment," NTT Review, vol. 3, No. 4 Jul. 1991, pp. 29-36.
Michael Kanellos, "Do You Want to Know The Meaning of Life?", Computer Reseller News, Mar. 3, 1997, pp. 72-74.
Michael Rogers et al, "Experts Abound at New Web Sites", Library Journal, Mar. 1, 2000, pp. 22-24.
"Netcall Internet Call Buttons Enhance E-Commerce Customer Service and Sales", PR Newswire, p. 7431., Aug. 1999.
PCT Search Report for PCT Application No. PCT/US01/48284, filed Oct. 30, 2001 (corresponding to U.S. Appl. No. 09/702,217) mailed May 13, 2002 (7 pgs.).
Qcircuit Web Site (www.qcircuit.com).
Richard A Kuehn, "The Voice of Technology," Credit World, pp. 20-23 (Jul. 1994).
Sell and buy advice online, The Ottawa Citizen, Nov. 29, 1999.
"Surfbrains.com: Brains online save time & money", M2 Presswire, Jul. 11, 2000.
Tehrani, Rich, "e-Rip Van Winkle and the 60 Second Nap," Call Center Solution, vol. 18, No. 2, pp. 16(3)., Aug. 1999.
Telecommunications Buyers Guide and Directory, Editor & Publisher, pp. 29TC-38TC, Feb. 1994.
The Web Site at www.experts-exchange.com/.
The web-site at www.allexperts.com.
"TriNet's, Help Me, I'm Stuck, Internet Voice Button Services Pushes Web Pages to Online Users." Business Wire, Mar. 1998.
"USA Global Link Brings Interactively to Internet Shopping," Business Wire, Oct. 1998.
"UpSnap Selects LookSmart to Sell Premium Listings on FREE 411 Service for Text-Enabled Cell Phones", Nov. 4, 2004.
"Walker Digital Issued Landmark U.S. Patent No. 5,862,223 for Global Internet Marketplace for Experts", Business Wire, Jan. 26, 1999.
Welcome to the Electronic Emissary Project's WebCenter at www.tapr.org/emmisary/.
"Welcome to Jambo—the leader in Pay-per-Call Solutions" (search results) Oct. 17, 2005.
When Business Plan and Real World Clash, Wall Street Journal, Jun. 9, 1999, B1.
William H. Chimiak, et al, "Multimedia Collaborative Remote Consultation Tools Via Gigabit WAN in Teleradiology", IEEE 1994, Phoenix, p. 417 (7 pgs.).
USPTO Transaction History of U.S. Appl. No. 10/465,770, filed Jun. 18, 2003, entitled "Method and Apparatus for Prioritizing a Listing of Information Providers."
USPTO Transaction History of U.S. Appl. No. 11/072,147, filed Mar. 3, 2005, entitled "Methods and Apparatuses for Sorting Lists for Presentation."

(56) References Cited

OTHER PUBLICATIONS

USPTO Transaction History of U.S. Appl. No. 11/559,860, filed Nov. 14, 2006, entitled "Methods and Apparatuses for Prioritizing Advertisements for Presentation."

USPTO Transaction History of U.S. Appl. No. 11/688,245, filed Mar. 19, 2007, entitled "Methods and Apparatuses for Prioritizing Featured Listings."

USPTO Transaction History of U.S. Appl. No. 11/863,208, filed Sep. 27, 2007, entitled "Systems and Methods to Provide Communication References From Different Sources to Connect People for Real Time Communications."

ISA/US, International Search Report for International Application No. PCT/US05/12081, 3 pages, Nov. 17, 2006.

International Application No. PCT/US06/07023, Written Opinion and International Search Report, Aug. 7, 2007.

International Application No. PCT/US07/82439, Written Opinion and International Search Report, Feb. 21, 2008.

International Application No. PCT/US06/07047, Written Opinion and International Search Report, Aug. 9, 2007.

* cited by examiner

400

Tools Home > Reports Home > My Advertisers    Sign Out

Advertiser Group: [ALL ▽] — 401
Call Results: [ALL ▽] — 403
Display As: [Web Page ▽] — 405
Show Data For: ○ [Yesterday ▽] — 407
    ⦿ From: [09/01/2004] To: [01/06/2005] ↖ 409

[Create Report] — 411

All Advertisers
Date Range: 09/01/2004 through 01/06/2005. Call Result: All Calls.

| Advertiser | Calls | Call Charges | | Affiliate Earnings | |
|---|---|---|---|---|---|
| | | Average | Total | Average | Total |
| Advertiser A | 118 | $5.00 | $580.00 | $3.00 | $348.00 |
| Advertiser B | 29 | $3.50 | $98.00 | $2.49 | $72.21 |
| Advertiser C | 28 | $4.25 | $119.00 | $3.09 | $86.52 |

Home → Yellow Pages → Matching Categories → Mortgages (1-20 of 505)
Showing Yellow Pages results for "mortgage"

3 NEW More results ▷▷▷▷▷
SHOPPING
SECTIONS

| Yellow Pages | Merchandise | eBay Results | Web Results |

← Previous | Next →

| Search Again | |
|---|---|
| ▽ Show search form | ● Show: In New York NY only   ○ Map: Show Results on Map |

Advertisers

| Related Categories | |
|---|---|
| Real Estate | Arnold's Mortgages |
| Mortgages, Loans, & | Reverse Mortgages, all types, fast service NY & NJ |
| Insurance | only. We have 16 yrs experience in FHA HECM. |
| Mortgages | 99 Hudson St., New York, NY 866-638-2757 |
| ◁ Mortgage | Business Profile | map |
| Companies (33) | |
| Mortgage Brokers | Betty's Mortgages |
| (32) ▷ | Want flexible and low monthly payments? Talk to IndyMac about |
| | Flex Pay. Rates start at 1%. Choose your payments to suit your |
| Narrow Your Results | needs. Call today! |
| Using information | www.800IndyMac.com |
| provided by businesses | |
| | Carl's Mortgages |
| Products | Debt consolidation & home equity loans. Apply online today. |
| ◁ • 1 to 4 Family | 866-345-8388 |
| Residential Properties | |
| (1) ▷ | David's Mortgages |
| | World Class Mortgage Brokers for Residential, |
| Customers Served | Commercial, Construction, A-D Credit. |
| • Commercial (113) | 3130 Amboy Rd., Staten Island, NY |
| • Industrial (16) | www.interest.com |
| | |
| | Ellen's Mortgages |
| | Search and compare hundreds of mortgage rates and loan programs |
| | with no forms to complete. No cost. Shop lenders in your area. |
| | 866-899-8983 |

| Sponsored Links |
|---|
| Bank of America |
| 80% less paperwork |
| mortgage. |
| learn more>> |
| bankofamerica.com |
| Washington Mutual |
| Free Checking |
| (800)788-7000 |
| Wachovia |
| Trust. What you |
| need for a successful |
| partnership. |
| Wachovia.com |
| CitiFinancial |
| Bill consolidation, |
| unexpected |
| expenses, tuition, |
| vacation & home |
| 877-705-6663 |

Create Ad

Create Ad    Service Area    Category    Price Per Click    Finish

Below are your competitor's per click prices. User the drop-down menu to    Help [?]
view per click rates by category.

View by Category: [Your Categories (All) ▽]    More Advertisers >>

| Position | Business Name | Category | Price Per Click |
|---|---|---|---|
| 1 | Arnold's Mortgages | Mortgage Banks<br>Mortgage Brokers | $5.00 |
| 2 | Betty's Mortgages | Real Estate Agents<br>Mortgage Brokers | $4.50 |
| 3 | Carl's Mortgages | Mortgage Brokers | $4.00 |
| 4 | David's Mortgages | Mortgage Banks<br>Mortgage Brokers | $3.50 |
| 5 | Ellen's Mortgages | Banks and Credit Unions<br>Mortgage Banks<br>Mortgage Brokers | $3.00 |
| 6 | Fran's Mortgages | Financial Planning<br>Banks and Credit Unions<br>Mortgage Banks<br>Mortgage Brokers | $2.50 |

More Advertisers >>

FIG. 17

Create Ad

Create Ad   Service Area   Category   ▼Price Per Click   Finish

Below are your competitor's per call prices. User the drop-down menu to   Help [?]
view per click rates by category.

View by Category: [Your Categories (All) ▽]              More Advertisers >>

| Position | Business Name | Category | Price Per Call |
|---|---|---|---|
| 1 | Arnold's Mortgages | Mortgage Banks<br>Mortgage Brokers | $10.00 |
| 2 | Betty's Mortgages | Real Estate Agents<br>Mortgage Brokers | $9.00 |
| 3 | Carl's Mortgages | Mortgage Brokers | $8.00 |
| 4 | David's Mortgages | Mortgage Banks<br>Mortgage Brokers | $7.00 |
| 5 | Ellen's Mortgages | Banks and Credit Unions<br>Mortgage Banks<br>Mortgage Brokers | $6.00 |
| 6 | Fran's Mortgages | Financial Planning<br>Banks and Credit Unions<br>Mortgage Banks<br>Mortgage Brokers | $5.00 |

More Advertisers >>

FIG. 18

SYSTEM AND METHOD TO MERGE PAY-FOR-PERFORMANCE ADVERTISING MODELS

The present patent application claims priority from Provisional U.S. Patent Application 60/656,637, filed on Feb. 25, 2005, entitled "A System and Method to Merge Pay-For-Performance Advertising Models".

The present application is related to Provisional U.S. Patent Application 60/653,708, filed on Feb. 16, 2005 and entitled "Methods and Apparatuses for Pay-Per-Call Advertising in Mobile/Wireless Applications", Provisional U.S. Patent Application 60/653,660, filed on Feb. 16, 2005 and entitled "Methods And Apparatuses For Offline Selection Of Pay-Per-Call Advertise", and Provisional U.S. Patent Application 60/653,661, filed on Feb. 16, 2005 and entitled "Methods And Apparatuses For Geographic Area Selections In Pay-Per-Call Advertisement". The disclosure of the above referenced applications are incorporated herein by reference.

TECHNOLOGY FIELD

At least some embodiments of the present invention relate to sorting lists, such as search result lists for advertisement, publicity, etc.

BACKGROUND

The Internet is becoming an advertisement medium to reach globally populated web users. Advertisements can be included in a web page that is frequently visited by web users or that returns the result of a user requested search.

Typically, the advertisements included in the web pages contain only a limited amount of information (e.g., a small paragraph, an icon, etc.). The advertisements contain links to web sites that provide further detailed information.

In certain arrangements, the advertisers pay the advertisements based on the number of visits directed to the web sites through the links in the advertisements. Thus, the advertisers pay for the performance of the advertisements.

Performance based advertising generally refers to a type of advertising in which an advertiser pays only for a measurable event that is a direct result of an advertisement being viewed by a consumer.

Paid inclusion advertising is a form of performance-based search advertising. With paid inclusion advertising, an advertisement is included within a result page of a search. Typically, each selection (e.g., click) of the advertisement from the result page is the measurable event for which the advertiser pays. In other words, payment by the advertiser is typically on a per click basis.

Paid placement advertising is another form of performance-based advertising, similar to paid inclusion advertising. Typically, the payment for paid placement advertising is also on a per click basis. With paid placement advertising an advertiser wants the opportunity of having a particular advertisement placed at a prominent spot, e.g., at the top of a search engine result page, thereby to increase the odds of the advertisement being viewed.

In paid inclusion advertising or paid placement advertising, the advertiser may adjust the price the advertiser is willing to pay for each selection (e.g., click) to balance the cost for the advertisement and the odds of obtaining the desired prominent spot or a high position in a list of advertisements.

For example, one advertising site may create a single queue of advertisements, which is sorted based on the per-click price specified by the advertisers. Adjusting the prices allows the advertisers to change their own placement and the advertisement cost.

Currently, a search engine web site can present a list of advertisers/advertisements in response to a user request for certain information. The list of advertisers/advertisements may be sorted or selected for presentation partially according to the relevancy of the advertisements to the information requested by the user. The advertisers/advertisements may be sorted or selected for presentation partially according to the price the advertisers specified for payment of the performance of the advertisements.

In an existing advertising network, a web site may sort the pool of advertisements into two separate queues. One queue is for the direct advertisers of the web site; and the other is for the indirect advertisers of the web site. The entire queue of the direct advertisers is sorted ahead of the indirect advertisers so that the direct advertisers are better served than the indirect advertisers on the web site.

SUMMARY OF THE DESCRIPTION

Methods and apparatuses for merging different types of pay for performance advertisements are presented.

In one embodiment, a method includes: determining an indicator of potential revenue for a party from price information of a list of entities, which includes first price information for a first type of advertisements and second price information for a second type of advertisements; and sorting the list of entities based at least partially on the indicator of potential revenue.

In one embodiment, a method includes: converting price information for an advertisement of a first type to equivalent price information for a second type of advertisements.

In one embodiment, a method includes: determining automatically, based on a call bid amount for a second pay per call advertisement, a click bid amount for a first pay per click advertisement to provide a phone number of the second advertisement.

The present invention includes methods and apparatuses that perform these methods, including data processing systems that perform these methods and computer readable media which when executed on data processing systems cause the systems to perform these methods.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 4 illustrates a user interface to display affiliate earnings of a supplier of a seller network according to one embodiment of the present invention.

FIGS. 13 and 14 show examples of running advertisements to determine performance conversion rates for pay per click advertisements and pay per call advertisements for a category according to one embodiment of the present invention.

FIG. 16 shows a merged bidding queue displayed as advertisements on a directory according to one embodiment of the present invention.

FIG. 17 shows a merged bidding queue from Pay Per Click perspective according to one embodiment of the present invention.

FIG. 18 shows a merged bidding queue from Pay Per Call perspective according to one embodiment of the present invention.

DETAILED DESCRIPTION

Figure 1:
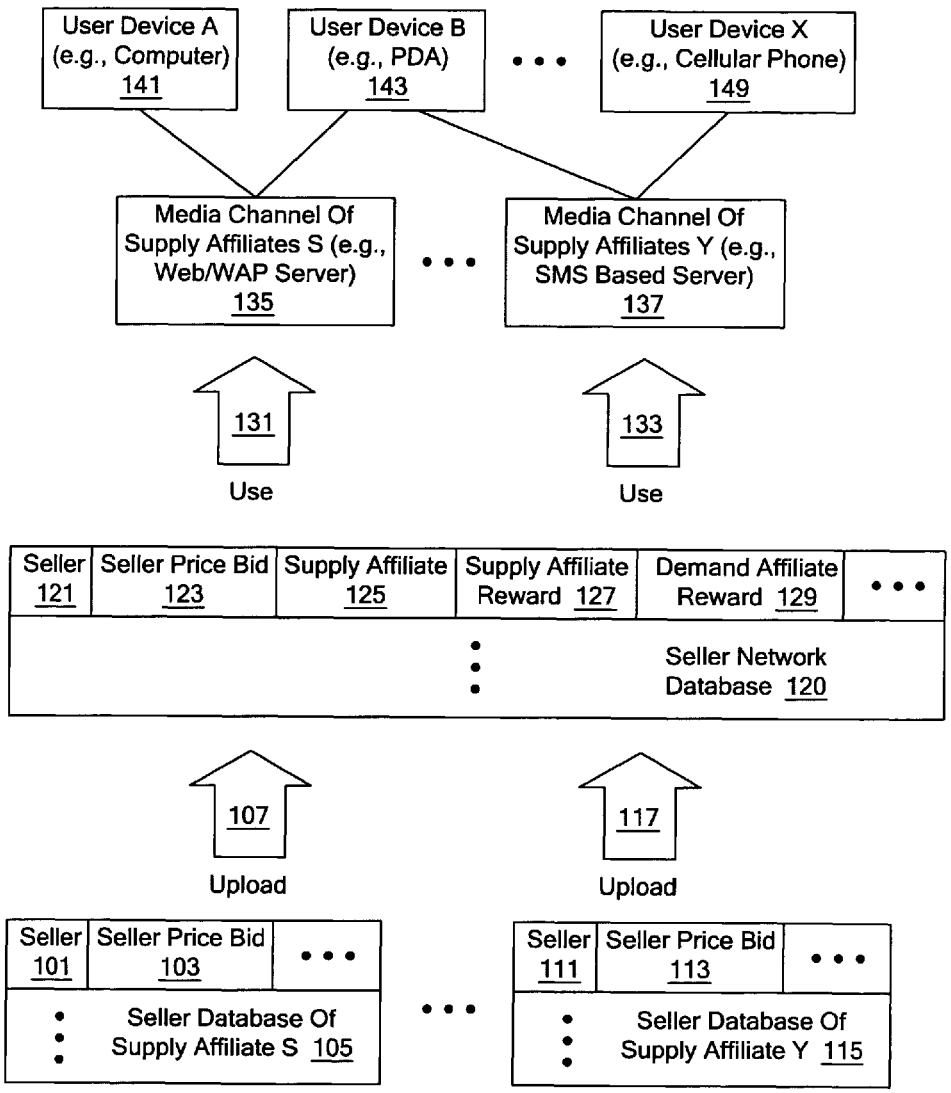
FIG. 1 illustrates a seller network according to one embodiment of the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

One embodiment of the present invention provides a system of a seller network. The seller network includes a number of supply affiliates who provide or supply sellers for the seller network. The seller network also includes a number of demand affiliates who drive the demand of the customers to the seller network. Some affiliates can be both supply affiliates and demand affiliates.

Demand affiliates can be used to drive traffic to a seller or a network of sellers, especially in the Internet world. For instance, third-party web sites may be rewarded for driving consumer demand to a network of sellers.

However, in some marketplaces, supply is more difficult to come by, especially marketplaces that rely upon many different sellers. It may be advantageous when the seller or seller network is large and diversified enough to satisfy the customers generated through the demand affiliates.

In one embodiment of the present invention, a system rewards supply affiliates in addition to demand affiliates. The system provides a platform to attract and reward generators of both demand and supply.

In one embodiment, the system provides a user interface or application programming interface (API) through which suppliers of sellers can supply their sellers into the network. Affiliates can add their sellers to the network, manage their sellers from the system interface, and maximize the benefit they receive through manipulating the way they display network listings on their own demand sites, such as through manipulating the sorted order of the listings. A media channel delivering seller listings, advertisements or similar advertising information to the potential customers can be called a demand site.

In one embodiment, the system provides the suppler affiliates with tools to manage and track the performance of their sellers, both individually and as a whole. In return for supplying the sellers to the seller network, the system rewards the supply affiliates. In one embodiment, the supply affiliate reward is based on the leads received, or the commerce conducted through the network or other measurable benefits received, by the sellers of the supply affiliates. Supply affiliate reward can be manifested in various forms including, but not limited to, percentile commissions, revenue share on lead charges or commerce transactions, bounties, lump sums, etc.

In one embodiment, a supply affiliate can be anyone with access to existing or potential sellers that may be brought into the seller network. For example, a supply affiliate can be an individual who recommends friends to join the network. A supply affiliates can also be a company which pools and manages a set of sellers for the network.

In one embodiment, a supply affiliate of the seller network with a supply affiliate reward system can display seller listings from the seller network on a media channel of the supply affiliate. The seller listings may include the sellers from the supply affiliate and/or from other supply affiliates of the seller network.

In general, a supply affiliate may or may not operate a demand site. When a supply affiliate facilitates a demand site for the seller network, the supply affiliate is also a demand affiliate. In return for facilitating the demand site to reach potential customers, the system also rewards the demand affiliates. In one embodiment, similar to the supply affiliate reward, the demand affiliate reward is based on the leads received, or the commerce conducted or other measurable benefit received, by the sellers through the demand site. The demand affiliate rewards can be manifested in various forms including, but not limited to, percentile commissions, revenue share on lead charges or commerce transactions, bounties, lump sums, etc.

In one embodiment of the present invention, the seller listings are sorted based on maximizing the revenue to the demand affiliate who may also be a supply affiliate, considering both supply affiliate reward and demand affiliate reward, rather than relying on a bidding order of the sellers. Thus, the affiliates may achieve maximum benefit within a seller network.

If all the direct advertisers were unconditionally sorted ahead of the indirect advertisers, greater revenue potential from higher-bidding advertisements from indirect advertisers might be lost.

If the relevant advertisers were sorted according to a strict bidding order, the financial implications of some affiliates of a seller network with a revenue share system might not be well considered. For example, a demand affiliate who is also a supply affiliate may be losing out by not getting the higher revenue from their own sellers, who, although may have lower bids, would provide both the demand affiliate reward and the supply affiliate reward to generate a higher overall revenue for the affiliate. This would create an uneven distribution of seller impressions on demand sites; and suppliers of sellers with demand sites might lose out on potentially greater revenues.

In one embodiment of the present invention, the seller listings (or in general, advertisements) are sorted at a demand site according to the revenue for a particular party in the seller network, such as a demand affiliate who may or may not be a supply affiliate, to overcome the limitations of the traditional sorting methods.

In one embodiment, when the demand affiliates sort the seller listings of a seller network to increase their respective revenues, the system effectively gives sellers better exposure on the demand sites of their suppliers, while still having a wider distribution of demand site impressions. The network effect can be maximized. The sellers can be displayed on various possible demand sites of the network, while less aggressive lower-bidding sellers can still rely on an advantage on the demand sites of their own supplier. This creates value for the entire network, but also ensures suppliers of sellers with demand sites that they can achieve the maximum amount of revenue for their position in the network.

In one embodiment, the affiliates can access the system to see reporting interfaces that encapsulate both the performance of their sellers and the subsequent supply affiliate rewards.

Note that in the present application, "advertisement" may refer to various different forms of presentations to attract attention or patronage. An advertisement may be simply a listing of identity and contact information (e.g., in a web page, a print media, a telephonic listing service, etc.), or a passage including one or more statements about business offering, etc., or a banner with graphical content and/or animation embedded in a web page, or a voice message presented in a voice channel (e.g., radio broadcasting, a voice portal with Interactive Voice Response (IVR), which may accept user input through voice recognition or through keypad input generated Dual Tone Multi-Frequency (DTMF) signals), or others.

Further details are provided below.

In one embodiment of the present invention, affiliates can upload their sellers into a seller network, manage their sellers and maximize the total revenue using a new sorting method (e.g., when displaying network listings on the demand site of an affiliate who is both a supply affiliate and a demand affiliate).

In one embodiment, to get suppliers of sellers integrated into a network, the system provides a user interface or API through which supply affiliates can set up or upload their sellers into the network. The system interface provides tools for the supply affiliates to manage and track the performance of their sellers, both individually and as a whole. In return for supplying the sellers, the system rewards the supply affiliates based on the received leads or conducted commerce in the forms of percentile commissions, revenue share on lead charges or commerce transactions, bounties, lump sums, etc.

A supply affiliate who owns demand sites in the network has several ways to achieve revenue/kickbacks, including: (1) getting kickback when a seller from the affiliate is connected to a consumer through the network on someone else's demand site (supply affiliate reward), (2) getting kickback when a seller from another affiliate is connected to a consumer on the demand site of the affiliate (demand affiliate reward), and (3) getting kickback when a seller from the affiliate is connected to a consumer through that the demand site of the affiliate (both the supply and demand affiliate kickbacks). Of these three scenarios, the supply affiliate can affect the relative frequencies of (2) and (3) by adjusting how the seller listings from the network are displayed on the affiliate's own demand sites to favor listings that increase total revenue, which may be from both supply and demand affiliate rewards or from only demand affiliate rewards. To achieve increasing benefit on the demand sites, the affiliates can sort network listings based on maximizing revenue potential for themselves, rather than relying on a strict bidding order. Given this position within the network, the sorted order implemented for displaying network listings on the demand sites effectively functions as a lever for controlling the revenue stream. Affiliates can exploit such a control to maximize revenues for themselves. Further, affiliates may access the system to see reporting interfaces that encapsulate both the performance of their sellers and the subsequent rewards to the supplier.

In one embodiment, a supplier of sellers can be a large-scale supplier, such as an advertiser supply company, or a single person taking part in a "seller referral program." For example, an individual person who brings in one seller to the network through referral and earns some percentage of kickback is also a supplier or supply affiliate. Thus, suppliers can be in a number of different forms.

In this description, the notion of a "seller" is independent of which party is paying for the network's services. For example, a lawyer who is advertising his/her business may pay for leads generated through an advertising network. On the other hand, the same lawyer may exist as a seller in an advice network where buyers pay for his/her consultation delivered through the network. In general, a seller can be a seller of products, goods, services, advices, etc., at an online or offline marketplace. An affiliate who brings such a seller to the marketplace is bringing value to the network, and therefore may be rewarded with a supply affiliate reward.

In one embodiment, the seller network is used to deliver seller listings (and in general, advertisements for the sellers) to potential customers. In one embodiment, the communications to obtain the seller listings are coordinated through the network. A seller network may distribute seller listings through various channels including, but not limited to, distribution on search-based web sites on the Internet, Wireless Application Protocol (WAP) servers, an Interactive Voice Response (IVR) telephony voice portal serving advertisements, an interface through which a live operator communicates seller listing information to customers, or print media, etc. Once the seller listing is presented to the customer, the connection between the customer and the seller can be performed through any type of communication medium including, but not limited to, phone calls (e.g., conventional landline based telephonic connection, wireless cellular connection, Voice over Internet Protocol (VoIP)), chat, video calls, e-mails, text messages, etc.

In one embodiment, seller listings (and in general, advertisements for the sellers) are sorted to maximize revenue for the owner of a demand site. Based on data attributes available to the owner of the demand site, many variations in sorting can be implemented. Some examples are provided below. In general, the listing data available to an affiliate is sorted according to the potential of total revenue to the affiliate to maximize revenue for the affiliate.

For example, consider a network in which sellers have set prices/bids for placement of their listings, and demand sites achieve a higher revenue percentage on transactions through the network if they are also the supplier of the seller listing. A given demand site may make 40% of the revenue when a transaction is completed from that demand site between a customer and an arbitrary network seller who was not supplied by the affiliate who owns the demand site, and 60% when the network seller was also supplied by the affiliate who owns the demand site. In this case, seller listings can be sorted for the demand site of the affiliate in decreasing order based on the potential total revenue for the affiliate, which may be computed from multiplying the seller listing bid by the percentage of revenue the affiliates makes from a transaction associated with that listing.

The seller network may also track click-through-rates, which shows the ratio of the number of user clicking through the links of the advertisement over the number of advertisement presentations. Click-through-rate represents the likelihood of a click-through resulting from the advertisement.

Similarly, when the advertisement is charged on the telephonic connections made as a result of the advertisement, call-through rate can be tracked and used to indicate the likelihood of a telephonic call resulting from the advertisement.

When an indicator of the likelihood of generating revenue from an advertisement for an affiliate is available, such as click-through-rates or call-through rates, the potential total revenue for the affiliate from an advertisement can be better estimated based on such statistical data. For example, the potential total revenue for the affiliate can be computed from multiplying the seller listing bid by the percentage of revenue the affiliate makes from a transaction associated with that listing and further by the indicator of the likelihood of generating revenue from that listing.

Thus, based on the revenue splitting schemes and/or the statistical data of revenue generating ratios, etc., the seller listing can be sorted to increase the total revenue that may be generated.

In general, a distributor of seller listings (and in general, advertisements) can utilize a system of the present invention regardless of supplier type, seller type, distribution method, and communication medium. Various detailed methods can be used in sorting the listings to increase revenue for a specific party of the system. When the affiliate has access to a number of sellers for displaying or distributing seller listings from the network, the affiliate can manipulate the sort order in the displaying of seller listings to maximize revenue to the supplier.

In one example, company X is an online marketing company that signs up and manages a number of advertisers, and distributes their advertisements (seller listings) through Company X's demand sites. The company decides to take its pool of sellers and function as a supply partner to a larger advertising network. With this arrangement, Company X displays advertisements from the network's advertisers on Company X's demand sites; and Company X's supply of advertiser listings will be displayed on other demand sites throughout the network. After making this decision, Company X accesses the network's system and uploads their advertiser listings into the network. Using the network's system, Company X can manage the listings and view reports of the performance of each of the individual listings as well as their performance as a supply affiliate.

Within the system, Company X's supply of sellers can be added to the pool of network advertisers for display on other demand sites; and Company X displays advertisements from the pool of the network's listings. Advertisers place bids for each of their listings which represent how much they are willing to pay for a customer lead through the network. When a transaction with one of Company X's advertiser's listings occurs on a different demand site (not owned by Company X), Company X receives 20% of the bid amount. However, when a transaction occurs on one of Company X's demand sites, they receive 40% of the bid amount if the listing was not from their supply, and 60% of the bid amount if the listing was from their own supply. The balance between transactions on Company X's demand sites that yield 40% and 60% effectively functions as a lever through which Company X can affect the revenue stream from their demand sites. In other words, Company X can potentially earn more from their demand sites by increasing the frequency of transactions that yield 60% relative to the frequency of transactions that yield 40%, if the bid amounts are about the same.

Company X previously sorted strictly by bid to display advertisements on Company X's demand sites. This might be sufficient before Company X joins the network. However, Company X is now a part of a large network where the revenue split varies for different sellers. According to one embodiment of the present invention, Company X may implement a new method of sorting the listings to increase revenue. For example, the listings can be sorted based on the bid amount multiplied by the percentage of revenue Company X receives.

If the previous sorting method were used, Company X would suffer the opportunity costs of not giving precedence to lower-bidding, higher-revenue-yielding listings over listings with higher bids but lower revenue yield. For example, using the old method a listing from a different supplier in the network with a $10 bid would be placed higher than a listing from Company X's supply with a $9 bid. Using the new method, the $9 bid listing would be placed higher. This is because Company X would effectively earn $5.40 when the customer communicates with the $9 advertiser, but only $4.00 when the customer contacts the $10 advertiser. Using the new method, the listings on the demand sites of Company X are sorted in a way to provide the most exposure for listings of the highest revenue yield for Company X.

Thus, the system allows suppliers of sellers with demand sites to maximize their revenue within a network that utilizes supply affiliate kickbacks. By implementing a revenue-maximizing sort order on their demand sites, a supplier may achieve an optimal revenue-yielding position within the network.

In general, applicability of embodiments of the present invention is independent of supplier type, seller type, distribution method, communication method, or minor variations in sorting criteria. To illustrate this point, consider the following separate example.

Company Y runs a web site that functions as a service marketplace to bring together buyers and sellers of live advice. Company Y manages hundreds of advisors who have listings to sell live tax advice through VoIP calls to customers at a set per-minute rates (each listing has its own rate). Company Y decides to join a large network of live advisors which includes business advice, psychic readers, etc. Company Y then uploads their live tax advisor listings into the network and manages them through the network system interface. Now Company Y's tax advisors can have their listings displayed on all of the demand sites in the network; and, Company Y also displays the listings for other advisors in the network on Company Y's own demand sites using Company Y's own sorting scheme. The network also distributes listings through other mediums as well, such as displaying on various mobile devices.

Previously, Company Y earned a fixed percentage of the total transaction charge and sorted the listings purely based on the per-minute rate that advisors charge for their services.

However, Company Y is now a part of a large network with supply partner kickbacks. According to one embodiment of the present invention, Company Y can implement a revenue-maximizing rule for sorting lists on their demand sites.

As the supply affiliate part of the network contract, Company Y earns 20% of the revenue from transactions initiated through their demand sites if the advisor is a network seller not from their supply, and 30% of the revenue from transactions initiated on their demand sites where the advisor is from their supply. On the demand sites of Company Y, the listings are now sorted in descending order of (advisor rate)×(revenue split). Thus, a tax advisor listing from Company Y's supply charging a rate of $5.00 per minute would be placed higher than another advisor listing from the network (but not from Company Y's supply) that charges a rate of $6.00. This is because Company Y would earn $1.50 per minute on transactions between customers and the $5.00 per min advisor, but only $1.20 per minute on transactions between customers and the $6.00 per min advisor.

The above examples demonstrate how a supplier of sellers can maximize the revenues earned on demand sites of the supplier when the supplier is within a large seller network that utilizes supply partner kickbacks. The benefit is provided to suppliers of sellers in second example as it does in the first one, even though the above examples have different types of sellers, distribution methods, and communication methods, etc.

In one embodiment, the sellers of a supply affiliate can be added to the network pool of sellers, through a system-provided interface or API, which may include mass upload functionality and/or individual add/delete functionality.

FIG. 1 illustrates a seller network according to one embodiment of the present invention.

In FIG. 1, seller databases of supply affiliates (e.g., 105, 115) can be uploaded (e.g., 107, 117) into the seller network database (120). For example, seller database of supplier affiliate S (105) may include a list of sellers (e.g., 101) with seller price bids (e.g., 103). Similarly, seller database of supplier affiliate Y (115) may include a list of sellers (e.g., 111) with seller price bids (e.g., 113).

In one embodiment, the supply affiliates may upload/supply their sellers into the seller network using different interfaces, such as a user interface which allows the manipulation of individual seller records, or an API that allows mass uploading. For example, seller records may be updated, added or deleted one at a time. Alternatively, the seller records may be submitted in a file transmitted through a network connection; and the file of seller records is then parsed for adding, deleting, and/or updating the seller records. For example, the file can be in an Extensible Markup Language (XML) or in a custom format.

In one embodiment, different supply affiliates may provide different types of seller records. For example, a supply affiliate in a referral program may provide the identity of the sellers. When the sellers join the network, the supply affiliate is rewarded with supply affiliate reward for the referral effort. Thus, in general, the supply affiliate may or may not provide the seller price bid information.

In the example of FIG. 1, the seller network database (120) includes the information of sellers (e.g., 121), seller price bids (e.g., 123), supply affiliates (e.g., 125) from whom the sellers are supplied to the network, supply affiliate rewards (e.g., 127) which are to be rewarded to the corresponding supply affiliate from revenue generated according to the seller price bids (123), demand affiliate rewards (e.g., 129) which are to be rewarded to the corresponding demand affiliate from revenue generated according to the seller price bids (123), and other information, such as click-through rates, call-through rates, etc.

In one embodiment, the supply affiliate rewards may be different percentages of the seller price bids for different sellers or for different supply affiliates. Alternatively, the supply affiliate reward for all sellers, or all sellers of a particular supply affiliate, may have the same percentage based on the seller price bids. Thus, sellers or certain groups of sellers may share the same data about supply affiliate rewards.

Similarly, sellers or seller groups may also share the same data about demand affiliate rewards.

Thus, in general, the seller network contains information about revenue sharing among various parties in the network, which may be organized different from that illustrated in FIG. 1.

In one embodiment, the seller network specifies the supply affiliate rewards and the demand affiliate rewards. For example, for supply affiliate of a referral program, the supply affiliate rewards may be a predetermined percentage (e.g., 5%) of the seller price bids. In one embodiment, supply affiliates may specify the supply affiliate rewards. For example, a supply affiliate may specify a percentage of seller price bids as the supply affiliate rewards, which can be adjusted by the supply affiliate to balance the revenue from individual transaction and the likelihood of successful transaction. When the supply affiliate reward is reduced, the demand affiliate reward can be increased; and the sellers of the supply affiliate are more likely to be displayed on the demand sites of other affiliates.

Similarly, the demand affiliate rewards may also be specified by different parties, such as the seller network, the supply affiliates, the demand affiliates, etc.

In one embodiment of the present invention, one same seller may be supplied to the seller network by different supply affiliates. To include the seller's listing, demand affiliates may select the supply affiliate according to the supply affiliate reward and/or demand affiliate reward.

In one embodiment, the seller network tracks the statistic data about transactions (e.g., click-through rates, call-through rates, etc.). The demand affiliates may use the statistic data in computing potential revenues when sorting seller listings. The supply affiliates may use the statistic data to evaluate the performance of their sellers.

Alternatively, the supply affiliates may track the statistic data about transactions and provide the data to the seller network.

In one embodiment of the present invention, the demand affiliates of the seller network use (e.g., 131, 133) the seller network database to present seller listings for their users. For example, the media channel of supply affiliate S (135) (e.g., Web/WAP server) may deliver seller listings to user devices A (141) (e.g., computer), user device B (143) (e.g., PDA), etc., in response to the search requests from the users; and the media channel of supply affiliate Y (137) (e.g., SMS based server) may provide seller listings to user device B (143), user devices X (149) (e.g., cellular phone), etc.

In one embodiment, certain entities can be both demand affiliates and supply affiliates of the seller network. For example, in FIG. 1, affiliates S and Y are both supply affiliates and demand affiliates, since they both supply sellers to the network and presents seller listings using the seller network database.

In general, some demand affiliates may not be supply affiliates; and some supply affiliates may not be demand affiliates.

In one embodiment of the present invention, the seller listings are sorted according to total potential revenues for the demand affiliate, which may include both the supply affiliate reward and the demand affiliate reward.

In one embodiment, the seller network sorts the seller listings for the media channel according to an indicator of total potential revenue for the affiliate. Thus, a uniform sorting method can be applied to the media channels of the seller network.

Alternative, the seller network provides the indicator of total potential revenue to the demand affiliates, in addition to the seller price bid or instead of the seller price bid, to allow the demand affiliates to sort the listings according to their own criteria.

Alternatively, different demand affiliates may sort the seller listings differently according their own indicators of total potential revenue.

Figure 2:
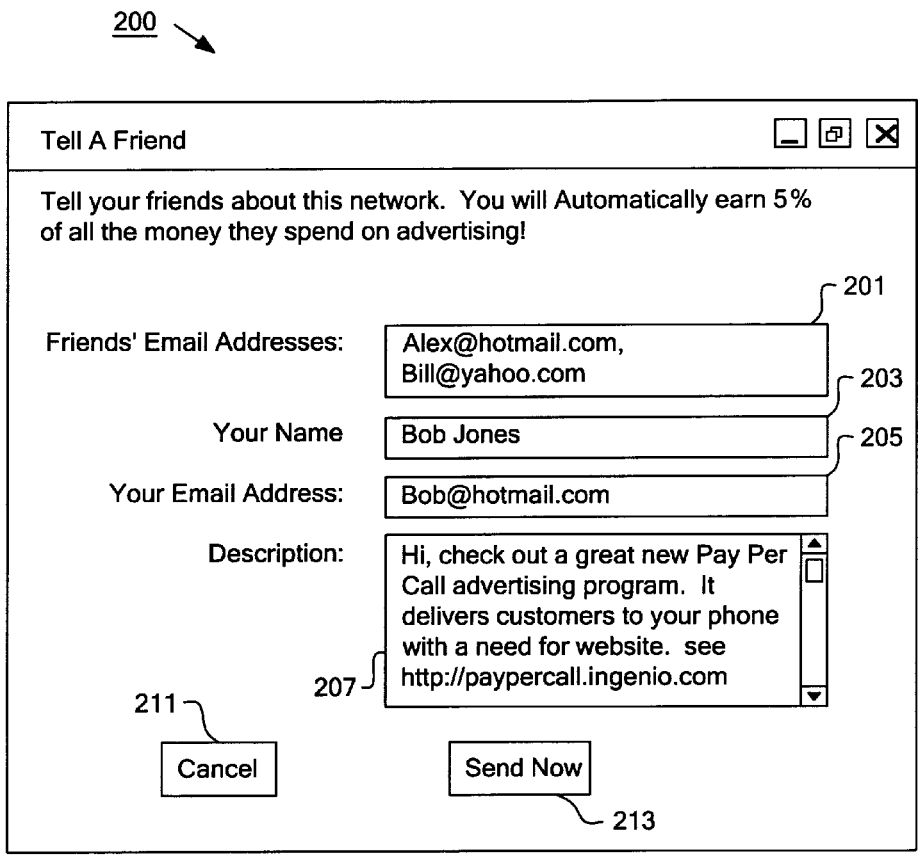
FIG. 2 illustrates a user interface to provide information about sellers from a supplier of a seller network according to one embodiment of the present invention.

FIG. 2 illustrates a user interface to provide information about sellers from a supplier of a seller network according to one embodiment of the present invention.

In FIG. 2, a supply affiliate is in the form of a participant of a referral program. The supply affiliate composes a message to friends through a user interface (200), such as a web page, a web-based email, a custom application program, etc. The "your name" field (203) and "your email address" field (205) are to receive the name and email address of the supply affiliate. The "friends' email addresses" field (201) is to receive a list of email address (e.g., separated by ","). The "description" field (207) is to receive a personalized message from the supply affiliate for referring the network (e.g., a pay per call advertising program).

When the "send now" button (213) is pressed, the personalized message received in the "description" field (207) is sent to the friends of the supply affiliate at the addresses specified in the "friends' email address" field (201). In one embodiment, the emails are sent in a way so that the emails appear to be sent directly from the supply affiliate as indicates in fields (203 and 205).

In one embodiment, a link containing parameters to identify the supply affiliate is added into the email message so that when the friends of the supply affiliate follows the link in the email to join the network, the system adds the friends as sellers of the supply affiliate. The supply affiliate automatically earns a percentage (e.g., 5%) of the money the friends spend on the network as supply affiliate rewards.

Alternatively, a reference number/string can be added to the email message which can be used by the friends to identify the supply affiliate. Alternatively, the email addresses of the friends can be used to correlate the friends with the supply affiliate when the friends join the network.

In one embodiment, the friends set up their advertisements and price bids for the advertisements directly with the network, without further help from the supply affiliate and in a way similar to direct advertisers of the network. However, a percentage of the advertisement spending of the friends goes to the supply affiliate for the referral effort.

Alternatively, the "cancel" button (211) can be pressed to close the interface without sending out the message.

Thus, a supply affiliate can represent a single individual, who may or not be a demand affiliate and who may have only one seller.

Figure 3:
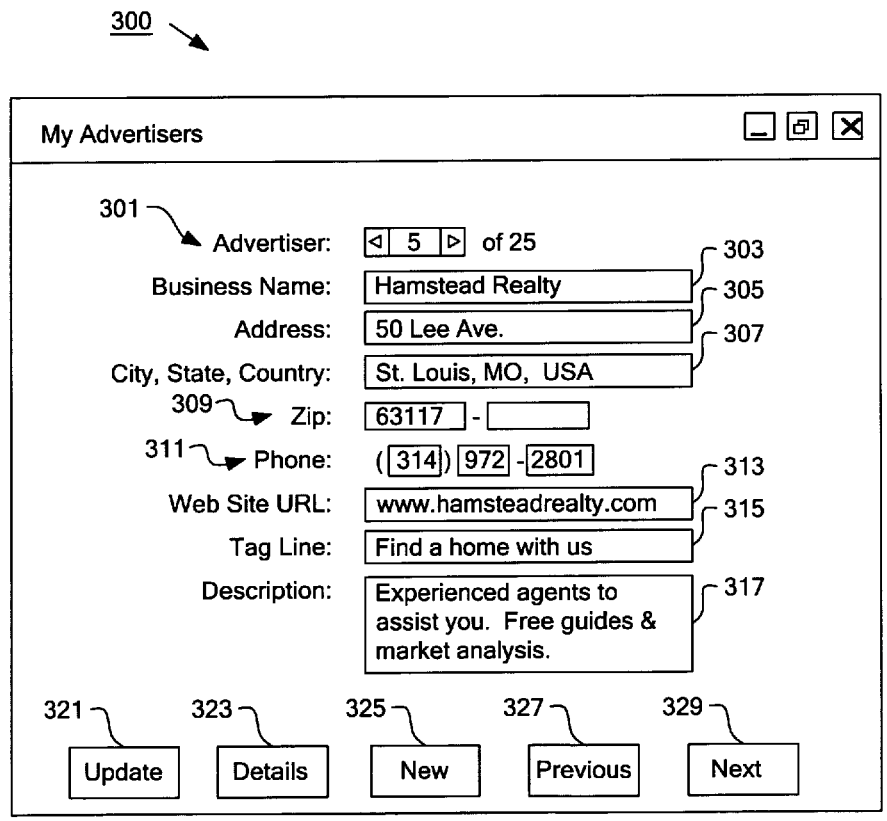
FIG. 3 illustrates a user interface to upload information about sellers from a supplier of a seller network according to one embodiment of the present invention.

FIG. 3 illustrates a user interface to upload information about sellers from a supplier of a seller network according to one embodiment of the present invention.

The user interface (300) allows a supply affiliate to individually access the sellers/advertisers of the supply affiliate. For example, a selector (301) can be used to select a particular advertiser of the supply affiliate.

In FIG. 3, in one embodiment, the user interface (300) is in the form of a web page rendered in a web browser of a user device, such as a computer, a notebook, a PDA, a web terminal, etc. The web page is to be downloaded from a server that is connected to the database for the advertisements. Alternatively, the user interface (300) can be based on a WAP application on a wireless mobile device, such as a cellular phone. Further, similar entry fields can be provided through the use of other communication channels, such as Email, Instant messages, SMS messages, etc. Further, an advertiser may fax a form, or make a telephone call, to provide the information to a human concierge, which uses such a user interface to enter the data into the database (e.g., using a custom application).

In FIG. 3, the user interface (300) contains entry fields for specifying the information an advertiser want to appear on the advertisement. The "business name" field (303) is to receive the name of the advertiser, which can be used to identify the advertiser in the database and in the advertisement.

The address, city, state, country and zip fields (305, 307 and 309) are to receive the location information about the advertiser. The location is typically a site where a potential customer may visit to obtain services and/or products.

The "phone" field (311) is to receive the telephone number at which the advertiser is to receive phone calls from potential customers. In one embodiment of the present invention, the phone number of the advertiser in the phone field (319) is not shown directly to the end users. An encoded/substitute phone number is used in the advertisement, so that when the encoded phone number is called the phone number of the advertiser is determined and connected to. This allows the tracking of phone calls generated from various advertisements for different advertisers and/or generated through different advertisement delivery channels.

The "web site URL" field (313) is to optionally receive a home web page address of the advertiser. In one embodiment, the advertisement is generated to contain a link to the web page as specified in the web site URL field (313) so that if the end user wants further details about the advertiser, the end user may click the link to visit the web page of the advertiser. In one embodiment, the advertiser is not charged for the link directing the web user to the web page of the advertiser. Alternatively, the advertiser may be charged for the link that is clicked to lead the web user to the web page of the advertiser. In one embodiment, the amount the advertiser is charged for the click is automatically computed from the pay per call price according to the click-through rate and call-through rate so that the average click-through revenue and the average call-through revenue is about the same.

In one embodiment of the present invention, the advertisement is not to include a link to the web site URL (313). The web site URL (313) is used to obtain further information about the business of the advertiser so that the advertisement can be placed in relevant media channels.

For example, the web pages at the web site according to the web site URL can be fetched and analyzed automatically to determine topics, categories, keywords, content, etc., so that the placement of the advertisement can be based at least partially on the topics, categories, keywords, content, etc. to increase the chances of the advertisement being of interest to the targeted users.

The "tag line" field (315) and the description field (317) are to receive one or more concise statements about the business offering, the unique ways of meeting customers' needs, how the business stand out from the competition, etc. In one embodiment, the information in the description field is presented in a text form. In one embodiment, the text in the description field can be enhanced with boldface and italic type, as well as formatting, using a Rich Text Editor, as supported by Internet Explorer for Windows or Mozilla Browsers (e.g., Firefox, Netscape, etc.).

In one embodiment, further optional information, such as a logo, an electronic coupon, etc. (not shown in FIG. 3), can be specified for the advertisement. In one embodiment, to provide an electronic coupon, one can simply specify a coupon headline, description and expiration date (if any). The coupon information is then store in the database and presented with the advertisement.

For example, when the "details" button (323) is pressed, a user interface for show further details is displayed. Further details may include electronic coupon information, price bid for advertisement, logo, advertisement budget (e.g., in terms of the number calls per day, monthly spending limit, etc.), targeted geographic area(s) of customers, business categories, key terms, etc.

In one embodiment, the "details" button can be further pressed to view information collected by the network for the supply affiliate, such as advertisement performance (e.g., call-through rate, total number of calls generated in a given time period, total charges/advertisement spending, rewards for the affiliate from the advertiser, etc.)

The "previous" and "next" buttons can be used to navigate through the set of advertisers of the supply affiliate. The "new" button can be used to enter information for a new advertiser of the supply affiliate; and the "update" button can be used to update information of an existing advertiser of the supply affiliate. Further buttons, such as a "delete" button for removing an advertiser, can be included.

In one embodiment, the seller network system further provides an API for the mass updating/uploading of seller information from a supply affiliate. For example, the supply affiliate may use its own application system to collect data about the sellers. The seller information is then communicated to the seller network through a file, or a network communication interface.

FIG. 4 illustrates a user interface to display affiliate earnings of a supplier of a seller network according to one embodiment of the present invention.

In FIG. 4, a sample reporting interface (400) displays statistics regarding the performance of the seller listings of a supply affiliate and the subsequent revenue to the supply affiliate. From here, the supply affiliate can track the performance of its sellers and the resulting supply affiliate earnings (427 and 429).

For example, the supply affiliate may separate the advertisers into a number of groups and select (401) a group or all groups for viewing. Different types of calls generated from the advertisements for the selected advertisers can be viewed separated or together using the "call results" selector (403). The "display as" selector (405) can be used to specify whether the result is displayed as a web page, an XML document, an email, a fax, a PDF file, etc. Time period selectors (407 and 409) can be used to specify a particular time period for which the activities are reported.

After specifying the parameters of the report, the user can press the "create report" button to obtain the result, which shows information such as the list of advertisers (420) and their corresponding calls (421) received as the result of the advertisement on the seller network, call charges (423 and 425) and affiliate earnings (427 and 429) for the affiliate, etc.

Figure 5:
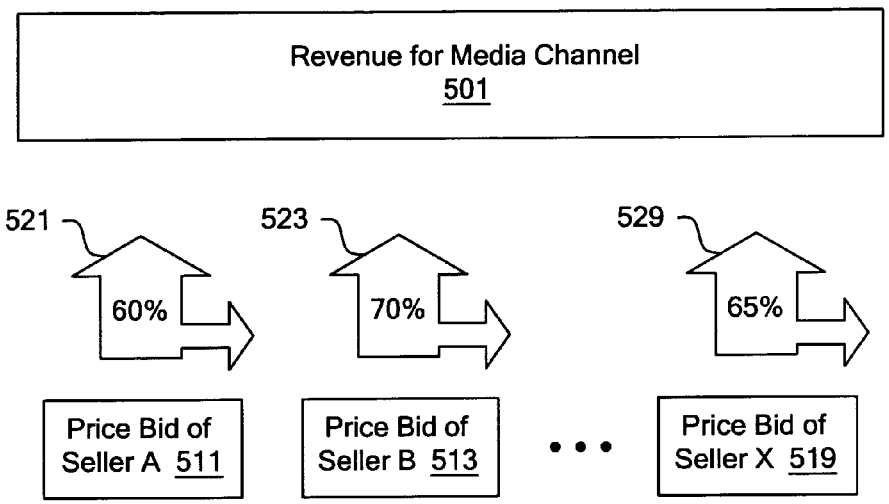
FIG. 5 illustrates a revenue distribution scheme in a seller network according to one embodiment of the present invention.

FIG. 5 illustrates a revenue distribution scheme in a seller network according to one embodiment of the present invention.

In one embodiment of the present invention, as illustrated in FIG. 5, the sellers to be listed/presented/advertised in a media channel provide different percentages (e.g., 521, 523, 529, etc.) of contributions out of the price bids (e.g., 511, 513, 519, etc.) of the sellers to the revenue (501) for the media channel. The revenues generated from the price bids of different sellers are distributed differently to multiple parties. Thus, an order of the price bids of the sellers does not represent an order of revenue potential for the media channel.

In one embodiment of the present invention, the sellers are sorted into a list based at least partially on an indicator of revenue potential, which includes the consideration of the differences in contributions from the price bids to the revenue for the operator of the media channel.

Figure 6:
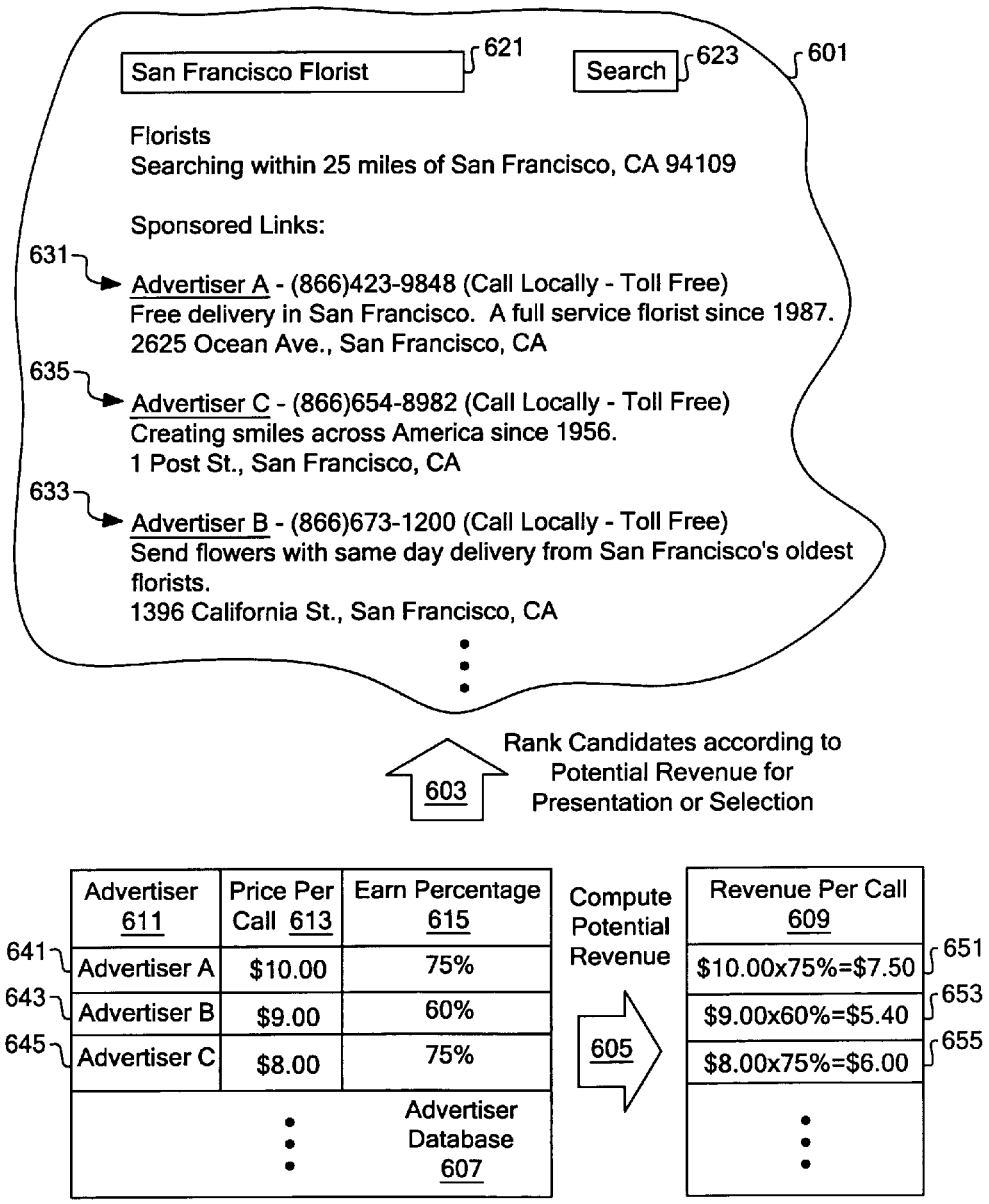
FIG. 6 illustrates a list sorting process to increase revenue for a media channel in a seller network according to one embodiment of the present invention.

FIG. 6 illustrates a list sorting process to increase revenue for a media channel in a seller network according to one embodiment of the present invention.

In FIG. 6, the advertiser database (607) includes a table of advertisers (611) with corresponding price per call (613) and earn percentage (615) for a media channel. To sort the advertisers, the potential revenue is computed (605). Revenue per call (609) indicates the amount that the media channel can earn out of the advertisements of the corresponding advertisers (611). For example, advertiser A (641) provides revenue per call of $7.50 (651), which is the product of the corresponding price per call and earn percentage.

In the example of FIG. 6, it is seen that the order of the revenue per call can be different from the order of price per call. For example, advertiser B (643) has a higher bid of price per call ($9.00) than advertiser C (645) ($8.00). However, advertiser B (643) has a lower earn percentage (60%) than advertiser C (645) (75%) for the media channel. As a result, the advertiser B (643) has lower revenue per call ($5.40) than advertiser C (645) ($6.00).

Interface (601) illiterates the display of seller listing according to one embodiment of the present invention. After the "search" button is pressed to request the results according to the search terms (621), the relevant advertisers are retrieved from the advertisement database. The candidates for the search results are ranked (603) according to the potential revenue (e.g., 609) for presentation or selection. For example, when the list of candidates is too long, only a top portion of the list is selected for presentation in the search result.

In the example of FIG. 6, the advertisers (631, 635 and 633) are listed in the interface (601) in a decreasing order according to the revenue per call (609), instead of the price per call (613). For example, the advertiser C (635) is listed ahead of the advertiser B (633), because the advertiser C has higher revenue per call (655) than the advertiser B, although the advertiser C has a lower price per call (613) than the advertiser B.

Figure 7:
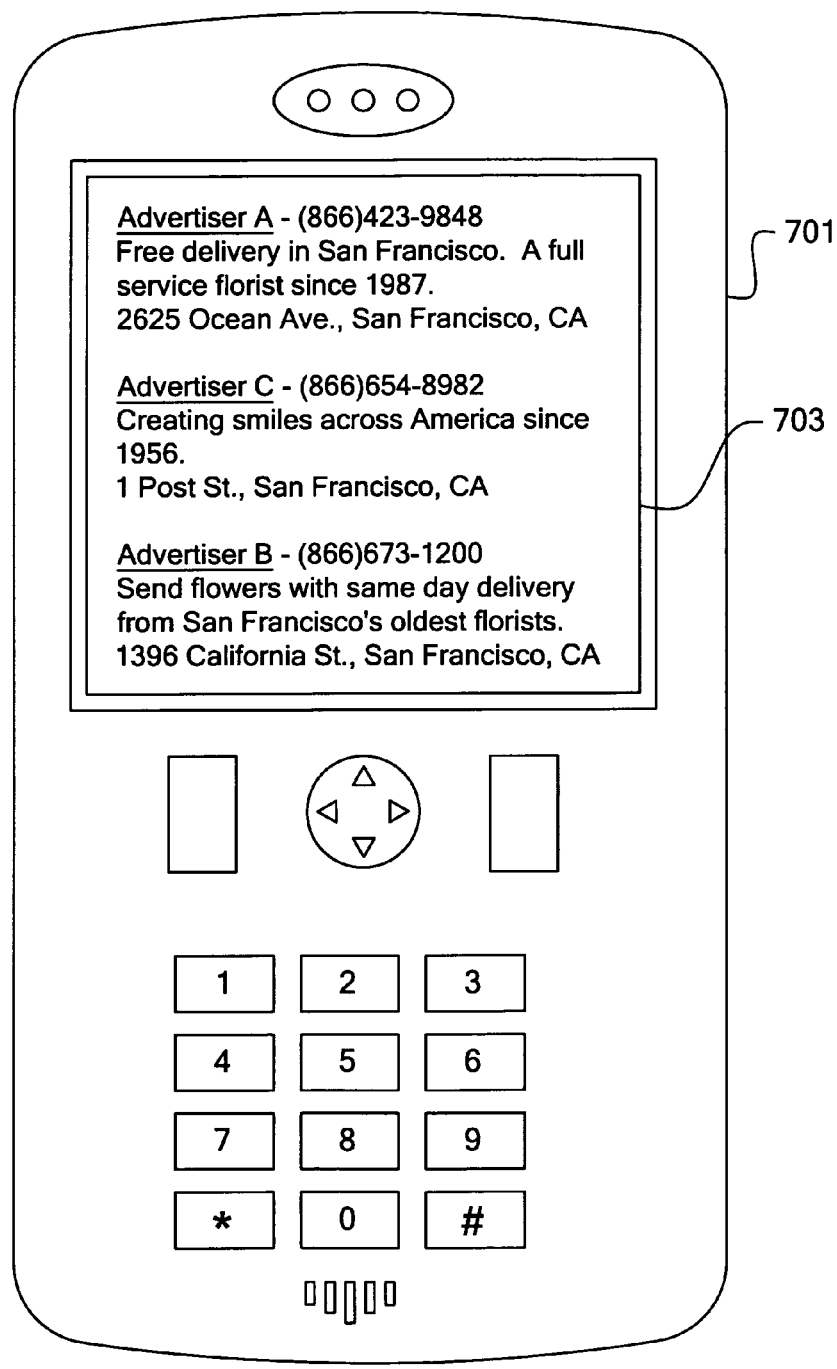
FIG. 7 illustrates an example of showing a list of sellers on a wireless mobile device in a seller network according to one embodiment of the present invention.

FIG. 7 illustrates an example of showing a list of sellers on a wireless mobile device in a seller network according to one embodiment of the present invention.

In FIG. 7, the seller listings (703) are presented on a mobile wireless device, such as a cellular phone (701). The list is sorted in a similar way as illustrated in FIG. 6. In one embodiment, the seller list is presented in response to a search submitted from the cellular phone to a web/WAP server, or a SMS based server. Alternatively, seller list may be presented as the mobile device enters a particular geographic area, in accordance with a preference of the user.

Figure 8:
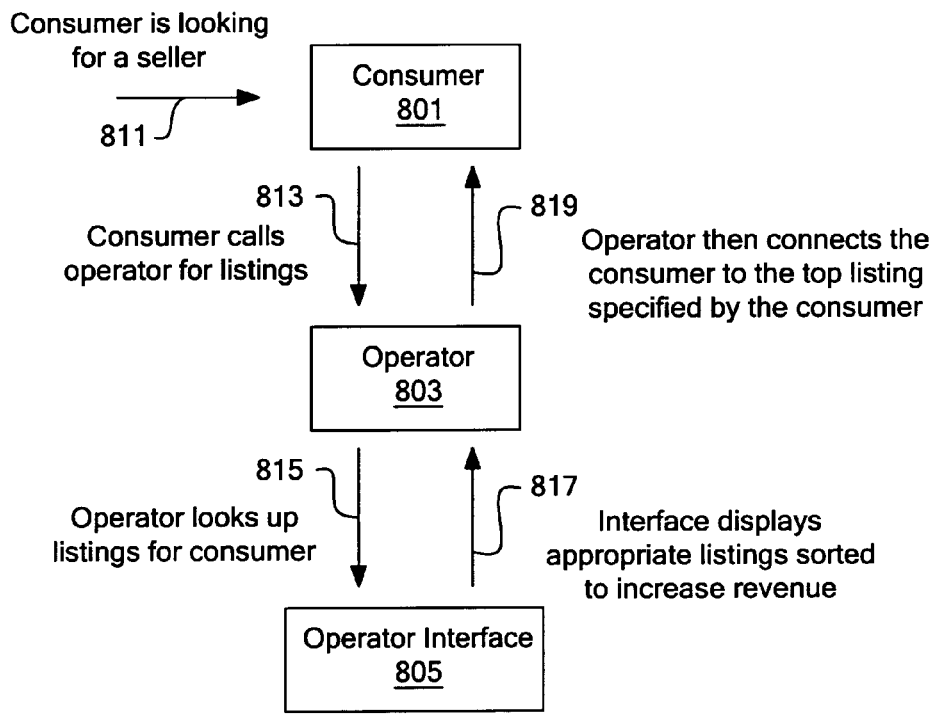
FIG. 8 illustrates a process of accessing sellers in a seller network according to one embodiment of the present invention.

FIG. 8 illustrates a process of accessing sellers in a seller network according to one embodiment of the present invention.

In FIG. 8, the consumer (801) may be looking (811) for a seller. The consumer calls (813) an operator for listings. The operation (803) looks up (815) listings for the consumer using an operator interface (805), which may be a custom application to access the seller network, or through a regular media channel, such as a web browser.

The interface displays (817) appropriate listings sorted to increase revenue for the operator. The operator (803) then connects the consumer to the top listing specified by the consumer.

Alternatively, the consumer may interactive with an IVR system using a voice recognition system and a text-to-speech system.

Thus, in general, the seller listings sorted according to embodiments of the present invention can be displayed or presented to various different entities, which may not be an end consumer.

In one embodiment of the present invention, the revenue share for the affiliates of a seller network is based on measurable events such as clicks on links provided in the listings/advertisements, phone calls generated from the listings/advertisements, etc.

In one embodiment, the seller network system tracks the measurable events and determines the affiliate rewards for the affiliates of the network. Alternatively, the demand and/or seller affiliates may also track the measurable events.

In one embodiment, to track the clicks the links are encoded with one or more parameters which can be used to determine the target address; and the links point to a web site which accepts the requests, records the clicks, determines the target address and forwards the requests to the target address.

In one embodiment, to track the phone calls resulting from the listings/advertisements, the phone numbers provided in the advertisements/listings are encoded so that the phone calls are directed to a phone call tracking facility first.

Figure 9:
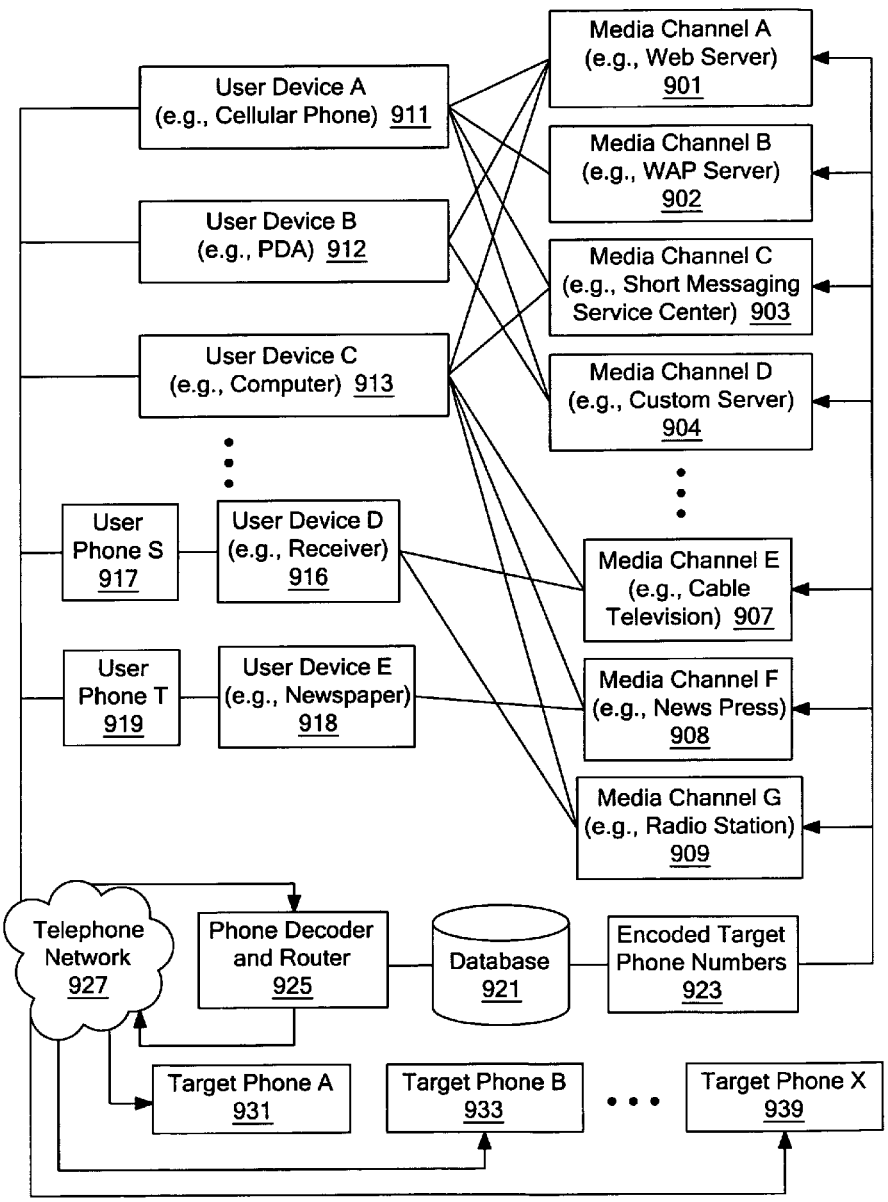
FIG. 9 shows a diagram of a system to make and track phone connections for a seller network according to one embodiment of the present invention.

FIG. 9 shows a diagram of a system to make and track phone connections for a seller network according to one embodiment of the present invention.

In FIG. 9, a database (921) may contain the phone numbers of target phone A (931), target phone B (933), . . . , target phone X (939), etc. Typically, the target phones belong to the institutions, businesses, individuals, etc, which seek for publicity through various media channels, such as media channel A (901) (e.g., web server), media channel B (902) (e.g., WAP server), media channel C (903) (e.g., short messaging service center), media channel D (904) (e.g., custom server), media channel E (907) (e.g., cable television), media channel E (908) (e.g., news press), media channel G (909) (e.g., radio station), etc.

In one embodiment of the present invention, the phone numbers of the target phones are not directly publicized over the media channels. Instead, encoded target phone numbers (923) are used. Using the encoded target phone numbers (923), a user cannot reach target phones directly. The encoded target phone numbers (923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (911) (e.g., cellular phone), user device B (912) (e.g., personal digital assistant (PDA)), user device C (913) (e.g., computer), user device D (916) (e.g., receiver), user device E (918) (e.g., newspaper).

For example, one media delivering channel includes print media. A list of advertisements can be sorted according to one embodiment of the present invention before printing (e.g., newspaper). In the example of print media, the list can be sorted to maximize advertisement revenue, although the sorting may not be dynamic in response to a request from an end user.

In another example, a voice portal is used to deliver the advertisements. The voice portal can use an Interactive Voice Response (IVR) system to interact with the user. For example, the IVR system may use voice-recognition or keypad input to receive user input. According to the user input, the advertisements can be sorted dynamically to maximize revenue according to one embodiment of the present invention. In one embodiment, the IVR system presents an advertisement through a text-to-speech technique. Alternatively, the advertisement can be a pre-recorded voice message.

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, a SMSC, etc.).

In one embodiment, a user device is capable to dial a phone call (e.g., automatically according to the encoded phone number embedded in the content information when a user selects the number). Alternatively, a user may manually dial a phone call using a separate phone, such as user phone S (917) or user phone T (919).

In one embodiment of the present invention, dialing at least a portion of an encoded target phone number connects the phone call to a phone decoder and router (925) first. According to the encoded target phone number dialed, the phone decoder and router (925) determines the corresponding target phone number using the database (921) and connects the phone call to the corresponding target phone (e.g., one of target phones 931-939) through the telephone network (927).

Note the telephone network (927) may be circuit switched, package switched, or partially circuit switched and partially package switched. For example, the telephone network may partially use the Internet to carry the phone call (e.g., through VoIP). For example, the connection between the user phone/device and the phone decoder and router (925) may be carried using VoIP; and the connection between the phone decoder and router (925) may be carried using a land-line based, circuit switched telephone network.

In one embodiment of the present invention, the information associated with the encoded target phone number, such as the media channel used to provide the encoded target phone number to the users, is also decoded/retrieved using the database (921). Thus, the information associated with the encoded target phone number can be tracked/stored.

In one embodiment, the phone decoder and router (925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment of the present invention, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment of the present invention, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (925). In such an arrangement, a large number of encoded phone numbers are generally required to differentiate the different target phones and different media channels.

In one embodiment of the present invention, an encoded target phone number has more digits than a standard phone number. A first portion of the encoded target phone number has the same number of digits as a standard phone number to reach the phone decoder and router (925) through the telephone network (927); and a second portion of the encoded target phone number is to be decoded by the phone decoder and router (925). For example, the Dual Tone Multi-Frequency (DTMF) decoder can be installed in the phone decoder and router (925) to detect the second portion of the encoded target phone number dialed at the user phone. The detected phone number can then be used to recover the target phone number.

When an encoded target phone number has more digits than a standard phone number, the additional digits can be implemented as a telephone extension, or as an IVR system.

In one embodiment of the present invention, a single telephone number is used to reach the phone decoder and router (925) for different target phone numbers; and the portion of the encoded target phone number that is used to reach the phone decoder and router (925) is not used in determining the information associated with the encoded target phone number.

Alternatively, multiple telephone numbers can be used to reach the phone decoder and router (925); and the entire encoded target phone number can be used to determine the information associated with the encoded target phone number.

In one embodiment of the present invention, the encoded target phone numbers can have different numbers of digits. The advertisers may be arranged to bid for shorter encoded target phone numbers.

In one embodiment of the present invention, the encoded target phone numbers are assigned only when needed for use in a media channel.

In one embodiment, a look-up table approach is used to encode the information. For example, the database (921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (925). When such a mapping scheme is used, a look up table is not necessary. For example, an encoded target phone number may include a first portion that is the phone number of the phone decoder and router (925), a second portion that is the target phone number appended with a number mapped from an identifier of the media channel. To prevent the user from dialing the target phone number directly, an encryption/scrambling scheme can be used to encode the second portion, which is decoded at the phone decoder and router (925).

In one embodiment of the present invention, the phone decoder and router (925) determines the target phone number from the encoded target phone number dialed by the user and then dials the target phone number for the user and joins the phone calls so that the user can talk to the target phone.

In one embodiment of the present invention, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment of the present invention, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call-through a VoIP system when the user selects the encoded target phone number.

In one embodiment of the present invention, the user device dials the phone number for the user without the user manually press the sequence of the encoded target phone numbers. This greatly simplifies the process of make the phone call. Since a user device can dial a long sequence of number easily, a large number of digits can be used to encode the information without presenting any difficulties for the users.

In one embodiment of the present invention, the encoded target phone numbers are formatted so that the user device dials a first portion of the encoded target phone numbers to access the phone decoder and router (925), pauses for a short period of time for the phone decoder and router (925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 9, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

Figure 10:
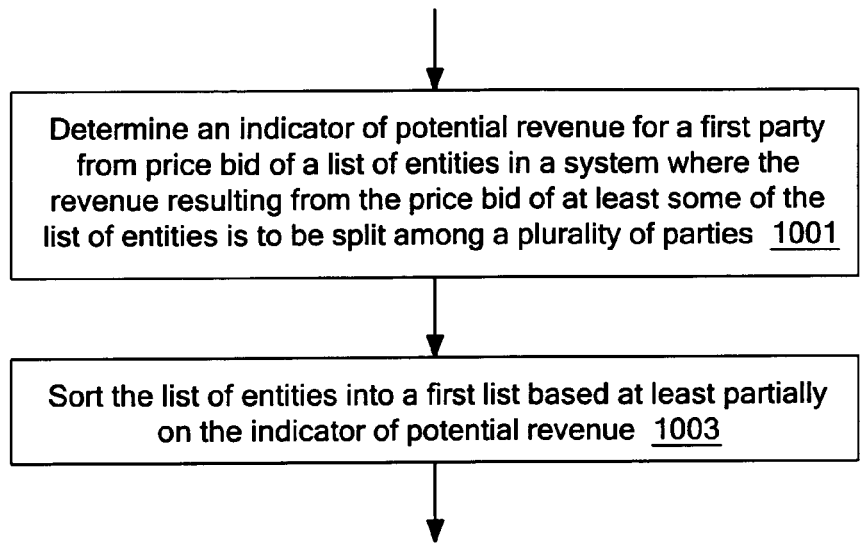
FIGS. 10-11 show flow diagrams of method to sort seller listings according to embodiments of the present invention.
Figure 11:
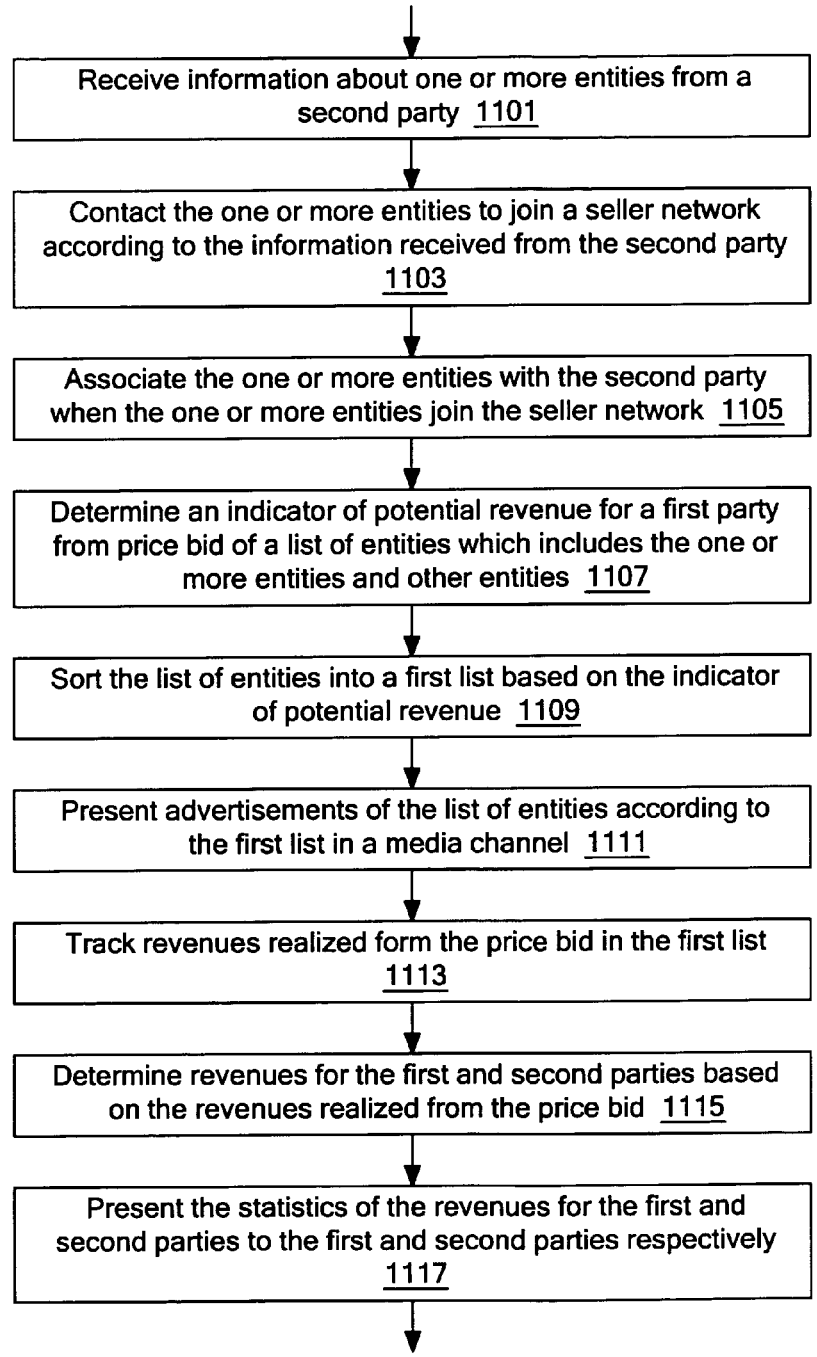

FIGS. 10-11 show flow diagrams of methods to sort seller listings according to embodiments of the present invention.

In FIG. 10, operation 1001 determines an indicator of potential revenue for a first party from price bid of a list of entities in a system where the revenue resulting from the price bid of at least some of the list of entities is to be split among a plurality of parties. Operation 1003 then sorts the list of entities into a first list based at least partially on the indicator of potential revenue.

In FIG. 11, operation 1101 receives information about one or more entities from a second party. Operation 1103 contacts the one or more entities to join a seller network according to the information received from the second party. Operation 1105 associates the one or more entities with the second party when the one or more entities join the seller network.

Alternatively, the second party may poll and manage the one or more entities and upload the entities to the seller network.

Operation 1107 determines an indicator of potential revenue for a first party from price bid of a list of entities which includes the one or more entities and other entities. Operation 1109 sorts the list of entities into a first list based on the indicator of potential revenue. Operation 1111 presents advertisements of the list of entities according to the first list in a media channel.

The one or more entities and other entities may contribute different percentages of the price bid to the revenue of the first party. For example, the price bid for the one or more entities is to be slit between the first and second parties; and the price bid for the other entities is not to be slit between the first party and another party.

Operation 1113 tracks revenues realized from the price bid in the first list. Operation 1115 determines revenues for the first and second parties based on the revenues realized from the price bid. Operation 1117 presents the statistics of the revenues for the first and second parties to the first and second parties respectively.

Figure 12:
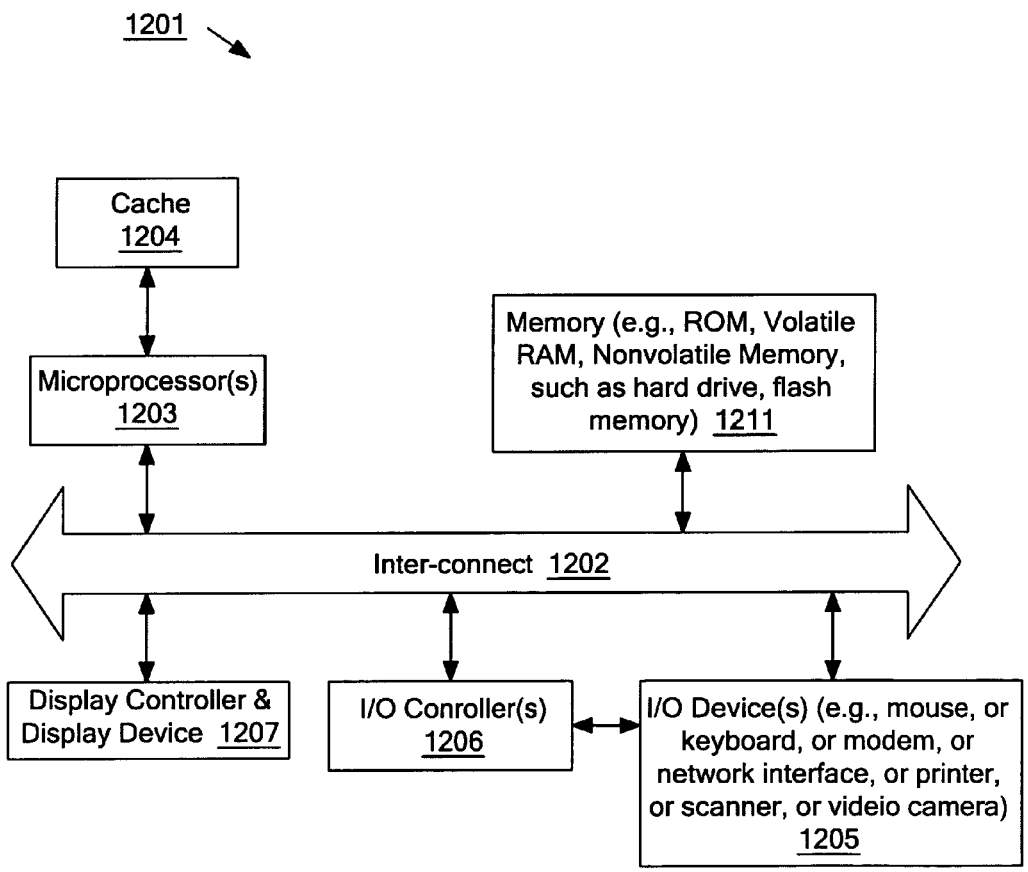
FIG. 12 shows a block diagram example of a data processing system which may be used with the present invention.

FIG. 12 shows a block diagram example of a data processing system which may be used with the present invention.

While FIG. 12 illustrates various components of a computer system, it is not intended to represent any particular architecture or manner of interconnecting the components. Other systems that have fewer or more components may also be used with the present invention.

In FIG. 12, the communication device (1201) is a form of a data processing system. The system (1201) includes an inter-connect (1202) (e.g., bus and system core logic), which interconnects a microprocessor(s) (1203) and memory (1211). The microprocessor (1203) is coupled to cache memory (1204) in the example of FIG. 12.

The inter-connect (1202) interconnects the microprocess(s) (1203) and the memory (1211) together and also interconnects them to a display controller and display device (1207) and to peripheral devices such as input/output (I/O) devices (1205) through an input/output controller(s) (1206). Typical I/O devices include mice, keyboards, modems, network interfaces, printers, scanners, video cameras and other devices which are well known in the art.

The inter-connect (1202) may include one or more buses connected to one another through various bridges, controllers and/or adapters. In one embodiment the I/O controller (1206) includes a USB (Universal Serial Bus) adapter for controlling USB peripherals, and/or an IEEE-1394 bus adapter for controlling IEEE-1394 peripherals.

The memory (1211) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment of the present invention, a server data processing system as illustrated in FIG. 12 is used in the processing system for a seller network to host seller network database, compute indicators of potential revenues for affiliates, track revenue generation and sharing for affiliates, provide interfaces for upload seller information, provide interfaces for affiliate reward reporting, and/or sorting seller listings for the affiliates, etc.

In one embodiment of the present invention, a server data processing system as illustrated in FIG. 12 is used in the processing system for an affiliate of a seller network to compute indicators of potential revenues, sorting seller listings according to indicators of potential revenues, provide seller listings to user terminals, and/or track revenue generation events, etc.

In one embodiment, a user terminal can be a data processing system similar to the system of FIG. 12, with more or less components. A data processing system as the user terminal can be in the form of a PDA, a cellular phone, a notebook computer, a personal desktop computer, etc.

Alternatively, the traditional communication client(s) may be used in some embodiments of the present invention.

In general, the routines executed to implement the embodiments of the invention may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention.

While some embodiments of the invention have been described in the context of fully functioning computers and computer systems, those skilled in the art will appreciate that various embodiments of the invention are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks, (DVDs), etc.), among others, and transmission type media such as digital and analog communication links for electrical, optical, acoustical or other forms of propagated signals, such as carrier waves, infrared signals, digital signals, etc.

A machine readable medium can be used to store software and data which when executed by a data processing system causes the system to perform various methods of the present invention. The executable software and data may be stored in various places including for example ROM, volatile RAM, non-volatile memory and/or cache. Portions of this software and/or data may be stored in any one of these storage devices.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Merge Different Types of Advertisements

In the online-directories advertising world, Pay Per Call can emerge as a viable pay-per-performance model. Further detail about Pay Per Call can be found in U.S. patent application Ser. No. 11/014,073, filed Dec. 15, 2004, U.S. patent application Ser. No. 11/021,939, filed Dec. 23, 2004, Provisional U.S. Patent Application Ser. No. 60/568,156, filed on May 4, 2004, Provisional U.S. Patent Application Ser. No. 60/560,926, filed on Apr. 9, 2004, and Provisional U.S. Patent Application Ser. No. 60/552,124, filed on Mar. 10, 2004. All the above-mentioned patent applications are incorporated herein by reference.

Pay Per Call offers advertisers a system through which advertisers can receive leads for their businesses via a channel—the telephone—that they understand well.

One of the main challenges in introducing a new advertising model such as Pay Per Call, however, is that the pre-existing model—Pay Per Click—already has wide acceptance after many years of use. Pay Per Call in its early state may therefore compete against Pay Per Call in its advanced state. An advertising model such as Pay Per Call in its early state doesn't yet have as many advertisers as Pay Per Click, and so prices that the relatively few advertisers are willing to pay—via their bids per lead—may not yet be as high as in the established click world. As a result, the newer advertising model may fail because it doesn't give the directory owner as much return for its advertising real estate.

For example, let's say an online directory called Directory.com is willing to adopt the new advertising model of Pay Per Call. However, the real estate in, for instance, the "mortgages" area of their directory is already occupied by Pay Per Click advertisers—mortgage brokers who have signed up to pay for each click they receive to their websites. Since the mortgage brokers paying for clicks have been doing so for many years, it's quite a liquid, mature market of advertisers. In other words, any value that is to be had from an end user clicking on a mortgage broker's online advertisement is well understood by the mortgage broker. He is therefore willing to pay a considerably high amount for such a click—perhaps $5 per click.

When Directory.com wishes to introduce the new advertising model of Pay Per Call onto the real estate of their "mortgages" section, they first want to be convinced to make room for the new advertisements, which is difficult because the page is already laid out with all of the real estate allotted in an optimal way. So it can be difficult to get Directory.com to build an entirely new advertising section.

Assuming Directory.com becomes convinced to allot real estate on the page for the new Pay Per Call model, their first question might be, "Do these new Pay Per Call ads earn me as much money as the existing click ads?" The answer, at first, may be no, because the new model doesn't yet have as many advertisers, so the amounts they have bid to pay for each lead—via a phone call—may not add up to be as much as the existing model after all leads and their prices have been tallied.

For Directory.com, this will likely mean that they will discontinue the new advertising model. Because at the end of day, Directory.com wants to maximize the revenue per pixel, or revenue per unit of real estate, of their website. And if a new advertising model has a lower revenue per pixel, it might be discontinued.

To make the situation more complex, the performance of the new advertising model of Pay Per Call versus the existing model of Pay Per Click may differ according to the category of the directory. Some categories may be more conducive to end users clicking versus end users calling. For instance, the category of "books" can be very conducive to end users clicking. By clicking, they can easily buy a book by clicking through an e-commerce website. It is less likely that they'd be willing to make a phone call regarding books to an advertiser since the click world services this category so well. The category of "plumbing," on the other hand, can be very conducive to end users calling. If an end user has a sink that is overflowing, it is quite likely that they want to immediately pick up the phone and dial a plumber to come to the house right away. The end user is less likely to want to click on an advertisement and spend a lot of time looking at websites.

Since some categories, such as books, are conducive to clicking and therefore may favor the Pay Per Click model, and other categories, such as plumbing, are conducive to calling and therefore may favor the Pay Per Call model, it becomes very difficult for Directory.com to make a decision as to which model to use. Ideally, Pay Per Click advertisements would automatically appear in click-conducive categories and Pay Per Call advertisements would automatically appear in call-conducive categories. But this can't happen if there are two separate sections of the page, one allotted to Pay Per Click ads and another allotted to Pay Per Call ads. In addition, there are thousands of categories, and determining the conduciveness of each for one model or the other can be cumbersome.

Another challenge in introducing a new advertising model such as Pay Per Call is that directories typically create a separate entrance for advertisers using the new model. If a directory has an established entrance and flow for signing up advertisers, it is quite cumbersome to have to create a separate entrance for the new model. Some advertisers may want to use both models, so it would be more ideal if the advertiser entrances were combined.

The problem, however, is that different models such as Pay Per Call and Pay Per Click use different "currencies." Pay Per Click uses the currency of clicks, in which the advertiser pays only when an end user clicks on an advertisement. Pay Per Call uses the currency of calls, in which the advertiser pays only when an end user dials the phone number listed on an advertisement. Clicks are far more prevalent than calls, which require a significant effort on behalf of the end user to pick up the phone and engage in talking to a person, as opposed to a web-site click which can be done offhandedly just out of curiosity. As a result, the currency of calls is worth much more than the currency of clicks. Therefore an advertiser would be willing to pay significantly more for a call event rather than a click event. Since the two models use these differently valued currencies, it might not seem possible to have the advertisers use the same entrance and view the same bidding queue for the two different models.

Thus, introducing the new advertising model of Pay Per Call presents many difficult challenges: it's a new model that competes with a mature existing model; it fights for new real estate in each directory; it has different success rates depending on directory category; and, it might require a new, separate entrance for advertisers to sign up at a directory. Due to all of these challenges of introducing the new advertising model of Pay Per Call, it would be quite advantageous if the new model had a system by which it could seamlessly combine with the existing model, despite their different currencies and different success rates.

One embodiment of the present invention presents a system by which the new Pay Per Call model is merged with the existing Pay Per Click model. As described above, there are significant challenges in merging the two models. The main challenge is that the two models use two different currencies: the currency of one is the click while the currency of the other is the phone call, both of which have different values. One embodiment of the present invention uses end-user conversion rates as a common denominator to merge the two currencies and systems.

Although many examples are illustrated to show the merging of pay per call advertising and pay per click advertising, from this description one will understands that such an approach can be extended to merge any types of pay for performance advertising in general.

In order to merge the two systems, one embodiment of the present invention uses a common denominator so that the two different currencies of clicks and calls can be mixed. This way, they can be displayed, and bid upon, on an equal or equivalent basis.

For this common denominator, one embodiment of the present invention uses end-user conversion rates. In other words, for a given category, such as "mortgages," one embodiment of the present invention first measures the conversion rates of the two advertising models. For instance, in the "mortgages" category, the system will determine how many times a Pay Per Call advertisement is clicked upon when it is viewed by end users 1,000 times. If the click advertisement is clicked upon 10 times per 1,000 page views, it has a conversion rate of 1%. Then the conversion rate of a Pay Per Call in the same location is measured. If the call advertisement is called 5 times per 1,000 page-views, it has a conversion rate of 0.5%. In one embodiment, a general conversion rate for a type of performance based advertising is determined to measure average ratio of the resulting number of measurable, payable events over the number of advertisement presentations.

Figure 13:
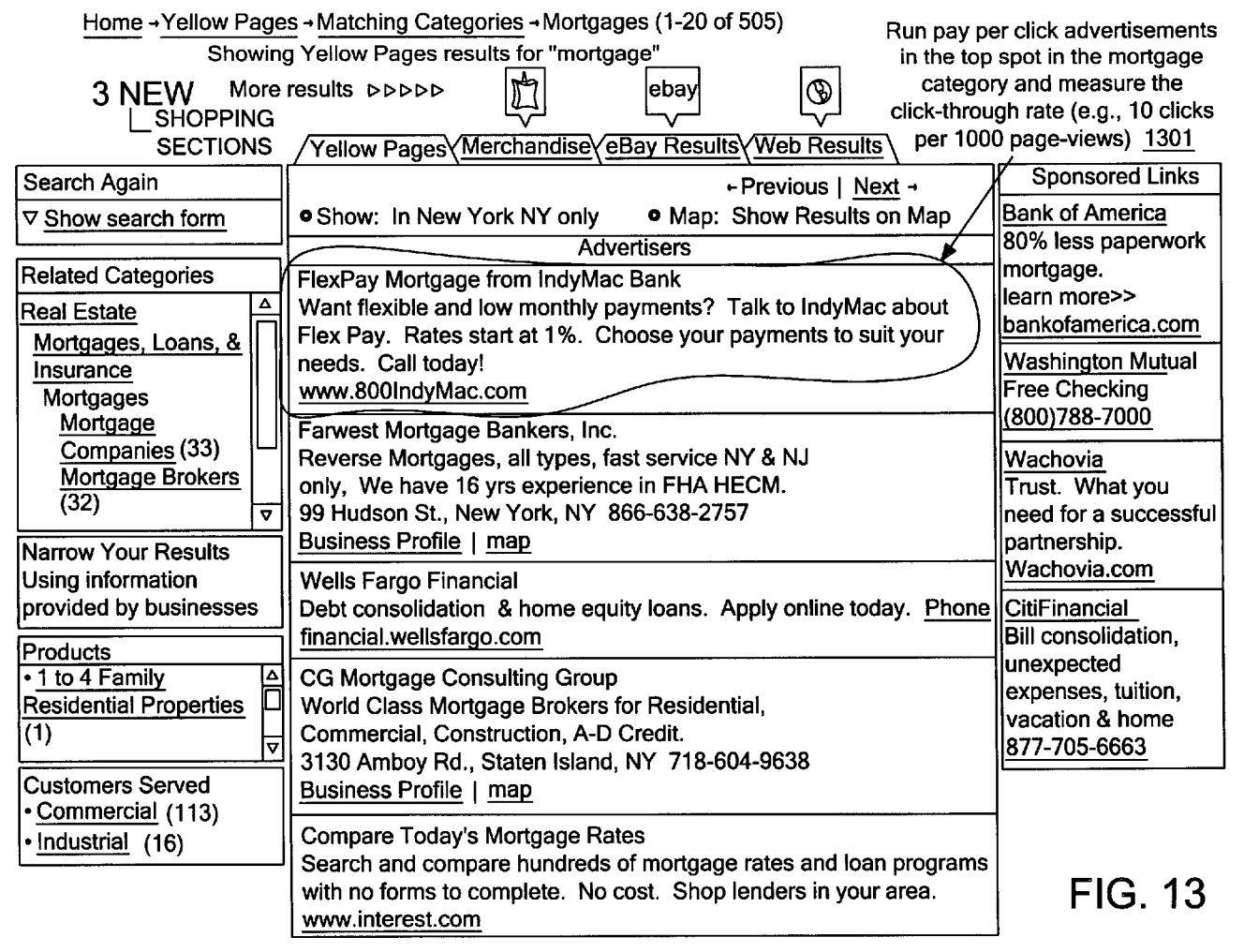
Figure 14:
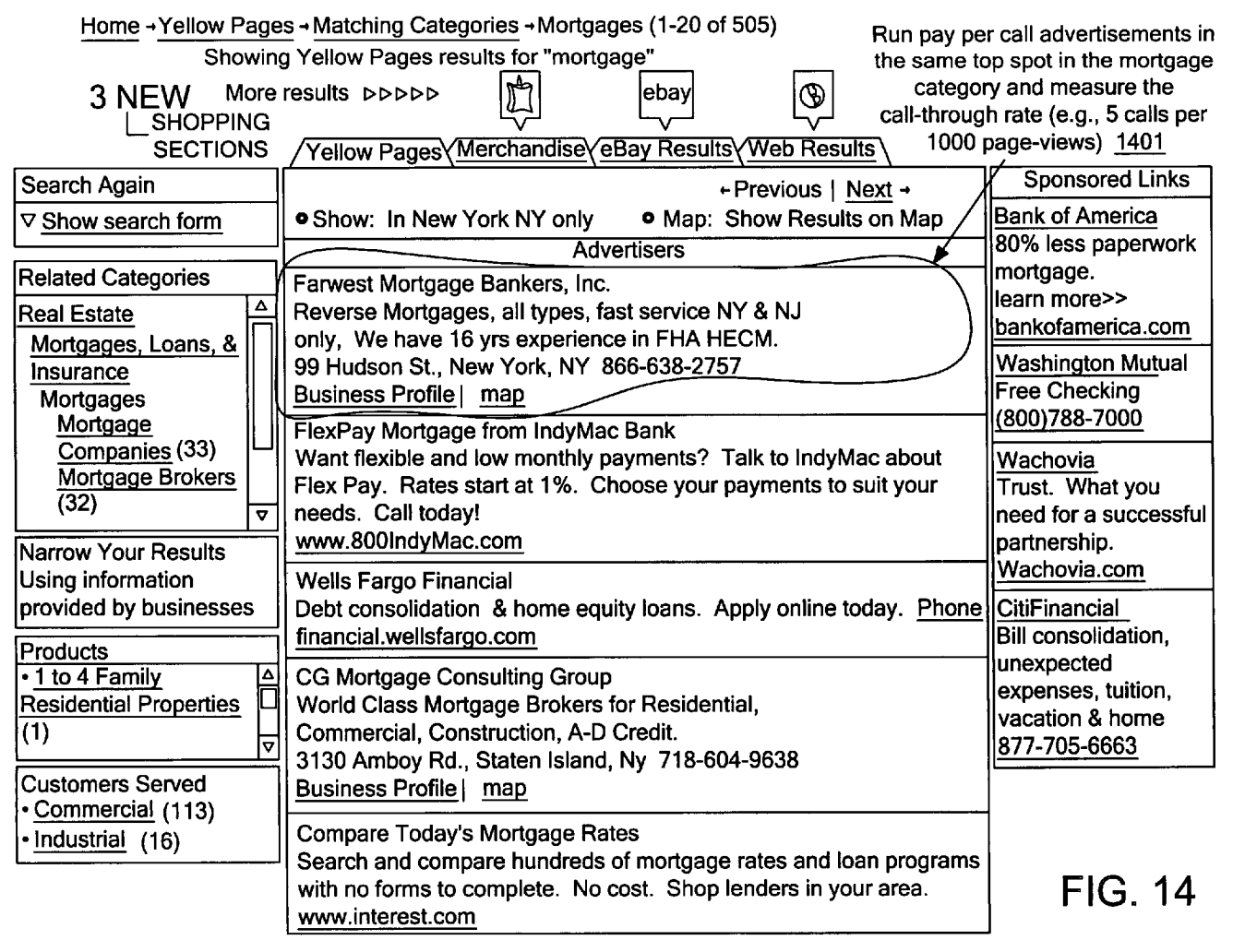

FIGS. 13 and 14 show examples of running advertisements to determine performance conversion rates for pay per click advertisements and pay per call advertisements for a category according to one embodiment of the present invention. In FIG. 13, the web site runs (1301) pay per click advertisements in the top spot in the mortgage category and measures the click-through rate (e.g., 10 clicks per 1000 page-views). In FIG. 14, the web site runs (1401) pay per call advertisements in the top spot in the mortgage category and measures the call-through rate (e.g., 5 calls per 1000 page-views). Thus, the end-user conversion rates for pay per call advertisements and pay per click advertisements at the same location in the advertisement media for advertisements of the same category can be determined.

If the system determines that clicks have twice the conversion rate as calls—1% versus 0.5%—it then has determined a conversion factor between the two advertising models: in this case, a factor of two. This conversion factor can be used to normalize the two models and produce a converted currency in which the two can coexist. For example, if 1,000 page-views produce 10 clicks in one model and 5 calls in the other, then the system knows that a call is financially equal to a click if the advertiser is paying twice as much for it. From this description, it is understood that the conversion rate can be used to normalize the bidding of the advertiser of two or more types of pay for performance advertisements.

For example, using this conversion factor of 2, the bidding queues of the different advertising models can be merged. The system has determined that, for the publisher of Directory.com, a Pay Per Call advertiser bidding $10 is financially equal to a Pay Per Click advertiser bidding $5. The system therefore takes the click bidding queue and interweaves call advertisers within it. The call advertisers' bids, however, are discounted by the conversion factor of 2. Because of this discounting, the two formerly disparate systems now have a common currency in which the advertisers can bid. In this example, the Pay Per Call bidding queue has been converted into the currency of clicks, and all are viewed in the click currency.

Figure 15:
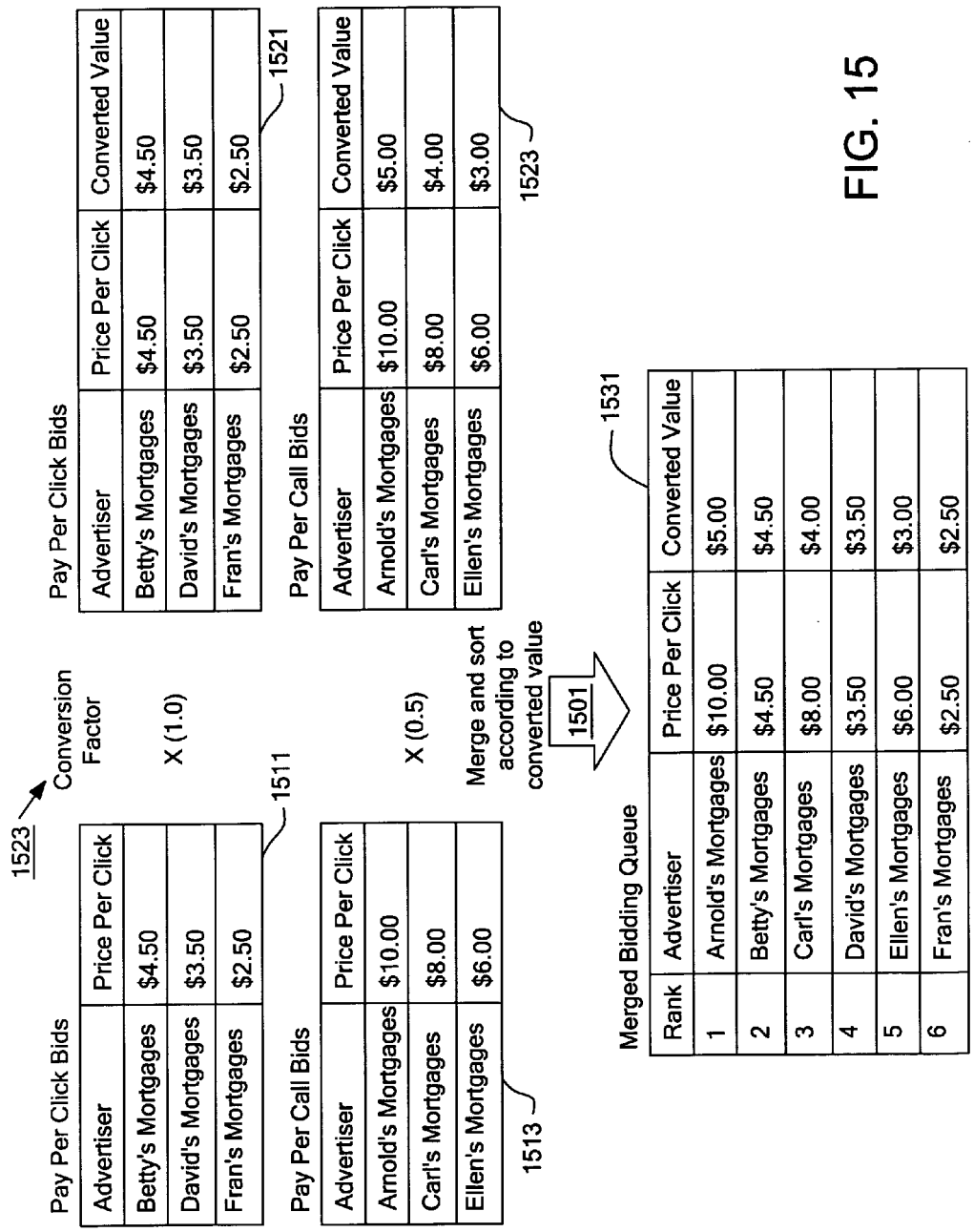
FIG. 15 shows a diagram illustrating how the bidding queue merges according to conversion factor according to one embodiment of the present invention.

FIG. 15 shows a diagram illustrating how the bidding queue merges according to conversion factor according to one embodiment of the present invention. In FIG. 15, the queue of pay per click bids (1511) and the queue of pay per call bids (1513) are merged and sorted (1501) according to converted value into a single queue of combined bids (1531). The prices per click and prices per call are converted into converted values (1521 and 1523) using the conversion factors (1523) determined based on end-user conversion rates, such as click-through rates and call-through rates. In FIG. 15, the conversion factor for the price per click is 1.0 so that the converted value of the price per click is the same as the price per click. Thus, the converted value of the price per call is in the form of price per click. Thus, the merged bidding queue (1531) can be seen as from the perspective of pay per click.

Alternatively, the conversion factor for the price per call can be 1.0; and the corresponding conversion factor for price per click will be 2.0. In such an alternative scheme, the converted value of price per call is the same as the price per call; the converted value of the price per click is in the form of price per call; and the merged bidding queue can be seen as from the perspective of pay per call.

Further, both of the conversion factors for the price per call and price per click can be different from 1. For example, the conversion factor for the price per call can be the call-through rate (e.g., 0.5%); and the corresponding conversion factor for the price per call can be the click-through rate (e.g., 1%). Thus, the converted value represents the average expected price per presentation of advertisement.

In one embodiment, the converted value generally represents an indicator of potential revenue for presenting an advertisement, regardless the type of advertisements, so that the different types of advertisements can be compared to each other on an equal or equivalent basis.

Similarly, the system can convert the Pay Per Click bidding queue into the Pay Per Call currency. It does this by multiplying the click bids by the conversion factor, which in this example is 2. In this way, a Pay Per Call advertiser could view merged queue, and compete apples-to-apples against a Pay Per Click advertisers.

Once the system has merged the advertisers' bidding queues of the two different models, it can next display both types of advertisements, interlaced according to the common bidding queue, on the same real estate of the page. No longer does a Pay Per Call advertising section of the page have to be created. It can now coexist with the existing Pay Per Click section of the page. Both types of ads are displayed together, merged in a common bidding queue and therefore display order.

FIG. 16 shows a merged bidding queue displayed as advertisements on a directory according to one embodiment of the present invention. In FIG. 16, the advertisements of Arnold's Mortgages, Betty's Mortgages, Carl's Mortgages, David's Mortgages, Ellen's Mortgages are displayed in the same advertisement section (1601) of the web page, according to the merged bidding queue (1531) sorted according to the converted value which is illustrated in FIG. 15. In the advertisement section (1601), pay per call advertisements and pay per click advertisements are mixed and ordered according to the earning potential to the operator of the web site.

Thus, the system is determining the end-user's, or the market's, preference for one model versus the other. The books category may have a clicks-to-calls conversion factor of 10, since end users prefer to click in this category. Suitably, merging and sorting the advertisements according to embodiments of the present invention will ensure that in this books category, Pay Per Call advertisers will have to bid about 10 times what a Pay Per Click advertiser is willing to pay for the same advertising slot. Conversely, in the plumbing category where end-users urgently need to get a plumber on the phone, the clicks-to-calls conversion factor may be 0.5. Therefore, merging and sorting the advertisements according to embodiments of the present invention will ensure that in this plumbing category, Pay Per Call advertisers will only have to bid about half of what a Pay Per click advertiser is willing to pay for the same advertising slot.

In this way, the online directory's "revenue per pixel," or its revenue per real estate of the page, can be optimized. By factoring in the end-user's, or the market's, propensity to interact with an advertisement in a particular category and weighting the advertisers' bids accordingly, the system ensures that the Directory is extracting the maximum value for advertising slots on the page. In this way, a system according to embodiments of the present invention automatically brings to the fore the types of advertisements that are best suited for each category. The books category, for instance, may come to be predominated by Pay Per Click advertisements. Similarly, the plumbing category may come to be predominated by Pay Per Call advertisements. Thus, this is achieved seamlessly and automatically in embodiments of the present invention.

In one embodiment, the system determines a conversion factor for individual advertisements. For instance, if a plumber has created a Pay Per Call advertisement with an extremely alluring offer, such as "Call now—available immediately to come fix your problem", that advertisement might be called 100 times per 1,000 page-views. The system would then compare the conversion rate of that individual advertisement versus the conversion rates of the other advertisements, both Pay Per Call and Pay Per Click. A particular not-so-alluring plumbing click advertisement might, for instance, get clicked on 10 times per 1,000 page views. The system would therefore weight these individual advertisements in the common bidding queue according to their conversion rates. The calls-to-clicks conversion factor in this example would be 100 to 10, resulting in a conversion factor of 10. In other words, the plumber with the alluring advertisement would only need to bid one-tenth as much as the plumber with the not-so-alluring click advertisement.

In one embodiment of the present invention, when the end-user conversion rate (e.g., call-through rate or click-through rate) is known for an individual advertisement, it is used to estimate the earning potential per presentation for this advertisement. When the end-user conversion rate (e.g., call-through rate or click-through rate) is not known for an individual advertisement, the end-user conversion rate for the corresponding advertisement category of a particular type of advertisement can be used. For example, the conversion rate for the plumber category of pay per call advertisement can be estimated and used to determine the earning potential per presentation for a plumber advertisement, when the call-through rate for the plumber advertisement is not available. The conversion rate for an advertisement category of a particular type of advertisement can be determined from sampling data as illustrated in FIGS. 13 and 14. Alternatively, the conversion rate can also be computed from the known conversion rate of individual advertisements in the category. For example, an average click-through rate of pay per click advertisements in a category can be computed as the conversion rate of the advertisements in the category. The averaging process may be weighted according to factors, such as the number of presentations in a past time period, the average prices per click during the past time period, etc. The earning potential per presentation for a list of different advertisements can be scaled back according to conversion rate of a particular advertisement (or a particular category of advertisement), to present the equivalent price from the perspective of the particular advertisement (or the particular category of advertisement).

Alternatively, the conversion factors are measured and then entered into the system manually. After determining that in mortgages, Pay Per Call advertisements are called 5 times per 1,000 page-views and Pay Per Click advertisements are clicked upon 10 times per 1,000 page-views, the conversion factor of 2 is manually entered into the system. The system then uses this factor to merge the bidding queues and display order for this category.

In one embodiment, the bidding queues and display orders are merged manually, using the conversion factor as an approximate guide. In other words, if in the category of books, clicks tend to be significantly more prevalent than calls, resulting in a conversion factor of 30, then the directory can conclude that Pay Per Call advertisements should be significantly lower on the page than Pay Per Call advertisements. It might therefore manually hardcode the first nine slots to be the top Pay Per Click bidders and reserve only the lowest tenth slot to be the top Pay Per Call advertiser.

One embodiment of the present invention uses the APIs, or Application Program Interfaces, of the Pay Per Click advertising system and the Pay Per Call advertising system in order to merge the two bidding queues and display orders. The Pay Per Call system, for example, will determine the top advertisers and bid amounts in the Pay Per Click system by making queries through the click system's API. Conversely, the Pay Per Click system will determine the top advertisers and bid amounts in the Pay Per Call system by making queries through the call system's API. The bid amounts of the top advertisers in one system are then converted to the equivalent bid amount in another system (e.g., using the end-user conversion rates or conversion factors). In one embodiment of the present invention, the API of the systems also provides an indicator of earning potential per presentation of an advertisement, in additional to or instead of price per performance measure (e.g., price per call or price per click). Thus, different advertising systems can communicate with each other with a common language.

One embodiment of the present invention merges the Pay Per Call bidding queue into the Pay Per Click bidding queue and display order using a combination of APIs and actual click bidding, perhaps even unbeknownst to the Pay Per Click system's administrators. In this embodiment, the system would use the API of a directory or search engine to read the click bid amounts as well as the click ads' estimated click-through rate, which is a commonly provided metric. The system would then take the Pay Per Call advertisers and use the calls ads' call-through rate and compare it to the click ads' click-through rate. The system would then merge the Pay Per Call advertisements into this click queue by automatically bidding for clicks that led to a web page featuring the advertiser's Pay Per Call phone number. The system would bid Pay Per Call advertisements into the click queue in this manner according to the conversion factor that would be dynamically determined by comparing the two system's click-through and call-through rates. In this embodiment, the systems effectively serves as an arbitrager, automatically purchasing click traffic only when this click traffic is less expensive on a converted basis than the price the advertiser is willing to pay per call.

In one embodiment of the present invention, an advertisement may include both pay per click element and pay per call element. For example, the advertisement shows both a phone number which when called will be connected to the phone number of the advertiser and a link which when clicked will lead the user to a web page of the advertiser.

When an advertisement includes both the pay per click element and pay per call element, the system may determine an earning potential based on price per call, call-through rate, price per click and click-through rate. For example, the earning potential can be the sum of the earning potential computed based on the price per call and call-through rate and the earning potential computed based on the price per click and click-through rate.

In one embodiment, the advertiser may specify the price per call after the price per click is specified; and for reference purpose, when the advertiser is specifying the price per call, the prices of the competitors are displayed from the pay per call perspective of this advertiser, with the consideration of the already specified price per click. For example, the already specified price per click may be converted into the equivalent price per call for the advertiser based on end-user conversion rates so that the advertiser may specify the price per call as the additional amount on top of the equivalent price per call based on the specified price per click.

Similarly, when the advertiser specify the price per click after the price per call is specified, the already specified price per call can be converted as the equivalent price per click, on top of which the advertiser may further specify the price per click to bid against the competitors from the pay per click perspective of this advertiser. Alternatively, the competitors' prices may be discounted by the equivalent price per click based on the already specified price per call for the advertiser in specifying the price per click of the advertisement.

When the advertiser creates a new advertisement, end-user conversion rates may not be available for the advertisement. The conversion rates can be estimated from similar advertisements in the same category. When the statistical data becomes available for the advertisement, better estimation of the end-user conversion rates can be computed.

For example, the advertiser may bid only from the price per click perspective, assuming the price per call is zero. After the price per click for the advertisement is specified, the system automatically computes the equivalent price per call using the estimations of end-user conversion rates.

One embodiment of the present invention automatically discounts any overhead costs associated with the competing systems. For example, a Pay Per Call system may have costs associated with it such as the allocation of toll-free phone numbers or telephony per-minute charges. The directory absorbs these costs. Therefore, it could be that Pay Per Call advertisements on average cost a directory 10 percent more than Pay Per Click advertisements. If this is true, this overhead cost is taken into account (e.g., in computing earning potential per impression, equivalent prices per measurable event, etc.). For example, it would automatically discount all Pay Per Call bids by 10% in relation to Pay Per Click bids, thereby ensuring that the directory is always displaying the advertisement that will earn it the most revenue, all costs included.

One embodiment of the present invention takes into account the supply source of the advertisers and similarly weights the advertisers' bids accordingly. For instance, a directory may contractually receive 70 percent of all Pay Per Call revenues that come from advertisers outside of their network. The same directory may contractually receive 90 percent of all Pay Per Call revenues that come from advertisers inside of their network—advertisers that the directory itself brought into the system. In this example, the bidding queue would be adjusted so that advertisers with a supply source outside of the directory—for which the directory earns less—would have their bids discounted according to the differential in earnings percentages so that the directory's overall earnings would be maximized.

One embodiment of the present invention merges bidding queues factoring in various combinations, or all, of the rates described above: the conversion rate of the Pay Per Click advertisements, the conversion rate of the Pay Per Click advertisements, the overhead costs of the two systems, the supply-source earnings percentages of the advertisers. In this way, the directory optimizes its revenue according to one embodiment of the present invention.

One embodiment of the present invention uses the principles to merge not only the Pay Per Call and Pay Per Click systems, but also that of other competing advertising platforms as well. A third type of advertisement, for instance, is a paid-call advertisement. In this advertisement, advertisers such as accountants and computer helpers are promoting a paid-call service in which the end user pays a price per amount of time spent on the phone for advice, such as $1.99 per minute, or $50 per one-hour consultation. These types of advertisements have radically different conversion rates than either Pay per Call or Pay Per Click advertisements because the end-user must not only click or call but also actually pay money for services. In this embodiment, conversion rates can also be used to produce conversion factors to merge paid-call advertisements with Pay Per Call and Pay Per Click systems. Further, a fourth type of advertisement, for instance, is a pay per video view advertisement. In this type of pay-for-performance advertising, advertisers pay for each time their video advertisements are viewed. This type of advertisements can also be merged with other types of pay-for-performance (e.g., pay per call and/or pay per click) using the end-user conversion rates in a way similar to the methods described above for merging pay per click advertisements and pay per call advertisements. In general, end-user conversion rates can be measured for any pay-for-performance based advertisements, regardless whether the advertisers pay for the advertisements or the end-users pay for accessing the advertisers and regardless the types of performance measuring events (e.g., click, call, video viewing, or other types of user actions); and the earning potentials can be estimated using different types of statistic data, based on the past performance of a particular advertisement, the past performance of a specific type of advertisements (e.g., of the same category, with the same advertisement placement position, to the same type of end user application/device, to the end users of the same geographic region, etc.)

Some examples on merging different advertising platforms are presented below.

In one example, an online directory called Directory.com is seeking to maximize the advertising revenue they derive from their site. For several years, they've had Pay Per Click advertisers bidding for placement in an advertising section in the right-hand column of their site. Now there is a new type of pay-for-performance advertising model, Pay Per Call, that many advertisers prefer. Directory.com would like to integrate Pay Per Call advertisements into their site, but they'd like to do so without compromising revenue. They would also prefer not to have to carve out another area of the page for additional advertising, because that would require a redesign of the entire page. They would also prefer not to create a whole new entrance for advertisers to use the new Pay Per Call system.

Directory.com therefore uses one embodiment of the present invention to integrate Pay Per Call advertisements within their pre-existing Pay Per Click advertisements. The conversion rate of Pay Per Click advertisements in each category in the directory is measured. The conversion rate of Pay Per Call advertisements in each category in the directory is also measured. The conversion rates are then used to derive a conversion factor for each category in the directory.

Once the conversion factor for each category has been established, both Pay Per Click advertisements and Pay Per Call advertisements can share the same bidding queue and display order.

Since the bidding queues have been merged, advertisers looking to create an advertisement at Directory.com can use the same online entrance that was once exclusively used to create Pay Per Click advertisements. There, they are asked to choose which type of advertisement they would like to create, Pay Per Click or Pay Per Call.

Advertisers choosing Pay Per Click can create an advertisement with one of its elements being a URL that the click directs to. Once the Pay Per Click advertisement has been created, the advertiser next bids for the advertisement's placement. The queue the Pay per Click advertiser sees, however, also includes Pay Per Call advertisements which have been weighted according to the conversion factor of that particular category. This merged bidding queue ensures that the directory will achieve the most competitive environment, with all types of advertisers competing against one another, thus making bids grow ever higher and maximizing the directory's revenue.

FIG. 17 shows a merged bidding queue from Pay Per Click perspective according to one embodiment of the present invention. In FIG. 17, a user is creating a pay per click advertisement. As a reference for the user to determine a price per click for the new advertisement, a list of prices per click is presented in a descending order. The list of prices per click includes equivalent prices that are converted from prices per call. For example, Arnold's Mortgages, Carls's Mortgages and Ellen's Mortgages use pay per call advertisements. As illustrated in FIG. 15, the prices per call (1513) can be converted into the converted value (1523) in a way that the converted value for the pay per click is the same as the price per click (e.g., using a conversion factor of 1.0 for price per click and a conversion factor of 0.5 for price per call, based on a 2:1 ratio of click-through rate to call-through rate for the "mortgages" category). Thus, the converted values of the pay per call are equivalent prices per click. Thus, the price information for both the pay per click advertising and pay per call advertising is presented in an easy to compare format.

Advertisers who choose to create a Pay Per Call advertisement can create an advertisement with one of its elements being a phone number that the call routes to. Once the Pay per Call advertisement has been created, the advertiser next bids for the advertisement's placement. The queue the Pay Per Call advertiser sees, however, also includes Pay Per Click advertisements which have been weighted according to the conversion factor for that particular category. Again, the merged bidding queue ensures the directory's revenue is maximized.

FIG. 18 shows a merged bidding queue from Pay Per Call perspective according to one embodiment of the present invention. In FIG. 18, a user is creating a pay per call advertisement. As a reference for the user to determine a price per call for the new advertisement, a list of prices per call is presented in a descending order. The list of prices per call includes equivalent prices that are converted from prices per click. For example, Betty's Mortgages, David's Mortgages and Fran's Mortgages use pay per click advertisements, as illustrated in FIG. 15. The prices per click can be converted into the converted value in a way that the converted value for the pay per call is the same as the price per call (e.g., using a conversion factor of 1.0 for price per call and a conversion factor of 2.0 for price per click, based on a 2:1 ratio of click-through rate to call-through rate for the "mortgages" category). Thus, the converted values of the pay per click are equivalent prices per call. Thus, the price information for both the pay per click advertising and pay per call advertising is presented in an easy to compare format.

Once the merged bidding queue has been established, the advertisements are ready to be displayed on the site. Fortunately, the merged queue of advertisements means that both Pay Per Click ads and Pay Per Calls ads can both appear interwoven in the same pre-established advertising area on the right-hand side of the site. No new real estate has to be carved out of the page.

Embodiments of the present invention ensure that the optimal type of advertisement appears in each advertising slot, with conversion rate and bid amount being the primary drivers. The directory can thereby maximize its revenue.

In addition, the directory will automatically display the type of advertisements that its end users prefer. Categories that are more conducive to phone calling, such as plumbing, become predominated by Pay Per Call ads, since the high conversion factor has made it prohibitively expensive for Pay Per Click advertisers to advertise there. The converse is true in the books area, where end users prefer to click into to buy books online, thereby weighting the bidding queue heavily toward Pay Per Click advertisements. Since end users are automatically being shown the type of advertisements they prefer according to category, the end-user customer experience at the directory is also optimized.

One embodiment of the present invention also takes into account additional factors when weighting the bidding queues. Preference, via a heavier bid weight, can be given to advertisers that Directory.com signed up. This maximizes the directory's revenue, since it earns more on these advertisers than ones that are syndicated via other sites. Similarly, one embodiment of the present invention also takes into account overhead costs. For example, since Pay Per Call advertisements cost the directory 10% more of overhead to pay for toll-free phone numbers and long-distance charges, all Pay Per Call bids are discounted by 10% on top of the other weighting.

Thus, various embodiments of the present invention maximize Directory.com's revenue and ensure that it has the optimal customer experience.

Figure 19:
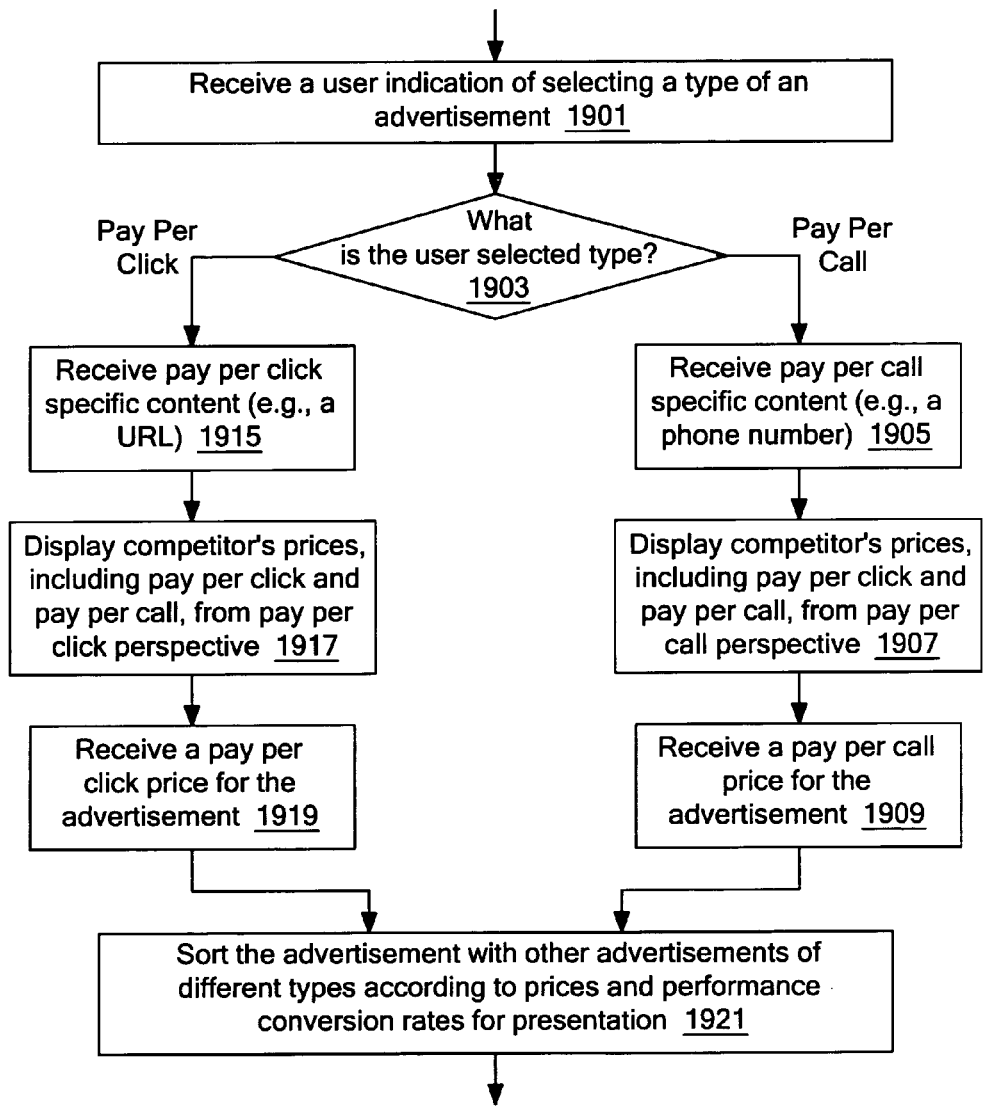
FIG. 19 shows a flow chart illustration a method to create an advertisement according to one embodiment of the present invention.

FIG. 19 shows a flow chart illustration a method to create an advertisement according to one embodiment of the present invention.

In FIG. 19, operation 1901 receives a user indication of selecting a type of an advertisement, such as pay per call or pay per click.

When operation 1903 determines that the user selected type is pay per click, operation 1915 receives pay per click specific content (e.g., a URL). Operation 1917 displays competitors' prices, including pay per click and pay per call, from pay per click perspective (e.g., as illustrated in FIG. 17). Operation 1919 receives a pay per click price for the advertisement.

When operation 1903 determines that the user selected type is pay per call, operation 1905 receives pay per call specific content (e.g., a phone number). Operation 1907 displays competitors' prices, including pay per click and pay per call, from pay per call perspective (e.g., as illustrated in FIG. 18). Operation 1909 receives a pay per call price for the advertisement.

Operation 1921 sorts the advertisement with other advertisements of different types according to prices and performance conversion rates for presentation.

Figure 20:
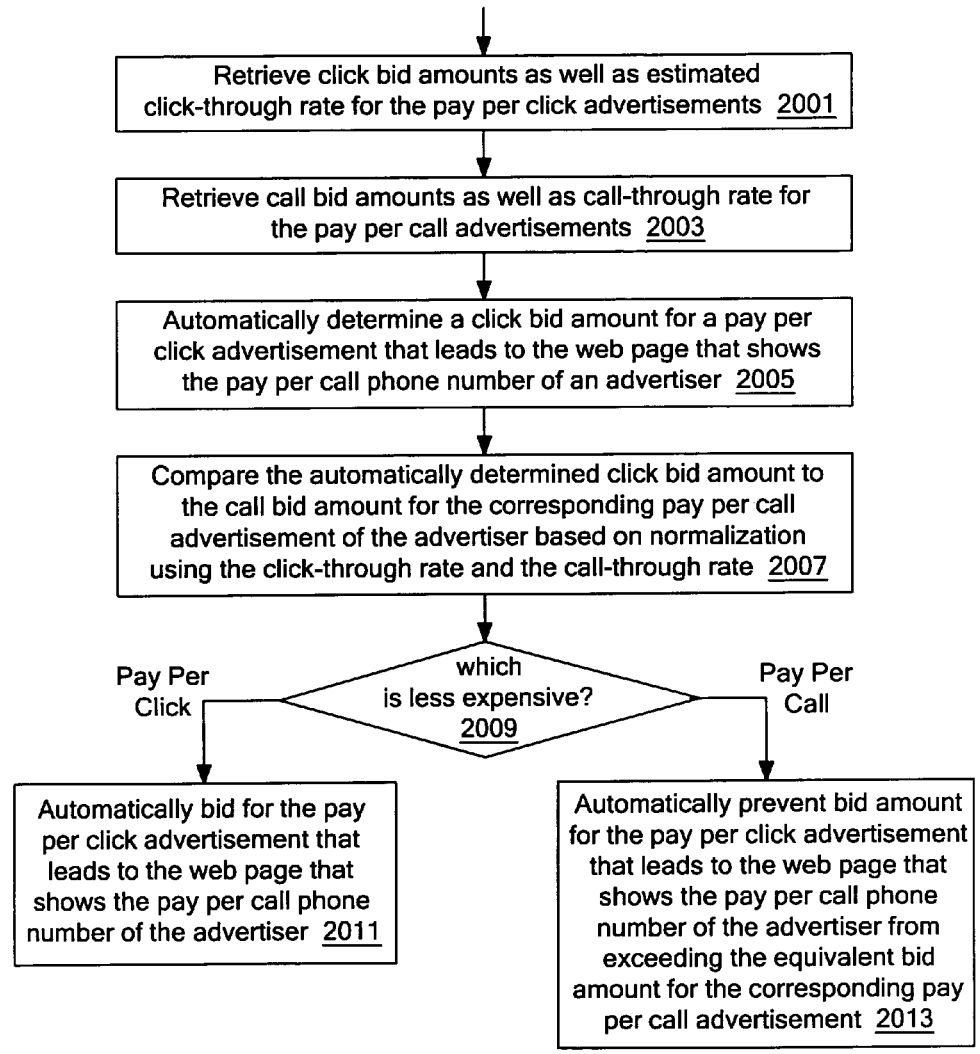
FIG. 20 shows a flow chart illustration a method of auto-arbitrager according to one embodiment of the present invention.

FIG. 20 shows a flow chart illustration a method of auto-arbitrager according to one embodiment of the present invention.

Operation 2001 retrieves click bid amounts as well as estimated click-through rate for the pay per click advertisements. Operation 2003 retrieves call bid amounts as well as call-through rate for the pay per call advertisements.

Operation 2005 automatically determines a click bid amount for a pay per click advertisement that leads to the web page that shows the pay per call phone number of an advertiser. Operation 2007 compares the automatically determined click bid amount to the call bid amount for the corresponding pay per call advertisement of the advertiser based on normalization using the click-through rate and the call-through rate.

If operation 2009 determines that Pay Per Click is less expensive, operation 2011 automatically bids for the pay per click advertisement that leads to the web page that shows the pay per call phone number of the advertiser.

If operation 2009 determines that Pay Per call is less expensive, operation 2013 automatically prevents bid amount for the pay per click advertisement that leads to the web page that shows the pay per call phone number of the advertiser from exceeding the equivalent bid amount for the corresponding pay per call advertisement.

In one embodiment of the present invention, the conversion rate estimation is based on not only the category but also the geographical regions. For example, when an advertisement is created, it can be specified which geographic area the advertisement is for. In one embodiment of the present invention, the advertisements are presented according to the geographic area the user is interested in. Thus, the conversion rates determined or used for the estimation of earning potential per presentation and/or the equivalent prices are based on the same geographical region.

In one embodiment of the present invention, the targeted geographic area of an advertisement may be specified in terms of a center area in terms of a particular street address, a city, a state, a zip code or a country. Alternatively, other types of center areas can also be specified. For example, the center area can be specified as an area of particular telephone area code, or an area of particular telephone area code and exchange, or a school district, a county, a metropolitan area, a region, a custom defined area, etc. Further, the geographic area may be custom defined on a map (e.g., a telephone area code map, a zip code map, a street map, a commercial district map, a state map, a national map, a world map, etc.). In one embodiment, a surrounding area within a specified distance way from the center area may also be specified as a part of the targeted geographic area for the advertisement. Different scales of units, such as mile, feet, yard, etc., can be selected for the radius value. Alternatively, the radius may be specified in terms of average travel time, such as the number of minutes for a walking distance or driving distance. Alternatively, the radius can be specified in terms of characteristics such as within walking distance, driving distance, etc. The system then determines an appropriate range according to the traffic condition for the area around the business location.

In one embodiment, the conversion rate estimation is based on the types of targeted media devices of the advertisements. For example, the conversion rates for general web users and the conversion rates for mobile/wireless users can be very different. Thus, the system may determine the conversion rate, equivalent prices, earning potential per presentation, etc., based on the type of target user devices and the type of services. For example, advertisements may be presented to a type of mobile device (e.g., cellular phone) in response to the user searching for one or more user specified words (e.g., using a WAP site or an SMS based search engine). Alternatively, the advertisements may also be presented to the same type of mobile device in response to the user entering a particular region, such as a commercial district. However, the click-through rates for the advertisements in response to searching and in response to the user entering a commercial district can be different. Thus, different conversion rates can be maintained for different types of advertisement environments for more accurate estimation of earning potentials.

In one embodiment, a pay for performance advertising model uses advertisements that are presented for groups of advertisers, such as a group of mortgage brokers in a particular geographic area. The advertisers specify the price per response, such as call or click, that are directed from the advertisements to the advertisers. The responses are distributed to the advertisers according to the prices specified by the advertisers. Other factors such as advertisement budges, response frequencies, etc., can also be considered in distributing the responses to the advertisers of the group.

In one embodiment, the measurable and payable event is call; and the advertisers may specify the price per call. However, since an advertisement is for a group of advertisers, the end-user conversion rate is also based on the end-user responses generated for the group of advertisers. Furthermore, since the group of advertisers may specify different prices, the system estimates a price from the set of prices specified by the group of advertisers. For example, the system may select the highest prices as the price for the advertisement in estimate the earning potential for comparison with other types of advertising models; alternatively, the system may determine an average price from a number of top prices (e.g., top ten bids); alternatively, the system may project the earning potential from the past statistic data in combination with the current set of price bids of the group of advertisers.

In one embodiment, the price conversion factor can further include the consideration of ordinal positions, category, geographic area, and/or other information.

For example, the price conversion may be specific for an ordinal position. To establish the price conversion for a particular ordinal position, the end-user conversion rates are computed based on the statistic data for advertisements placed at the same particular ordinal position. For example, to establish the price conversion factor between pay per call advertisements and pay per click advertisements for position three on the list of a page, the call-through rate for pay per call advertisements placed at position three and the click-through rate for pay per click advertisements placed at the same position are determined; the call-through rate and the click-through rate are then used to determine the conversion factor for advertisements placed position three.

When the ordinal position is considered, the list of advertisements to be presented is determined one at a time according to one embodiment of the present invention. For example, the conversion factor for the top position is first used to determine which of the top pay per call advertisement and the top pay per click advertisement is to be selected for the top position; then the conversion factor for position two is used to determine which of the top remaining pay per call advertisement and the top remaining pay per click advertisement is to be selected for the top position. Since different ordinal positions may have different conversion factor, the advertisements for the list are determined one at a time from the remaining advertisements.

Further, the ordinal positions may be aggregated. For example, one conversion factor may be specific for a block of positions (e.g., from position four to position ten); and, the conversion factor is determined according to the average call-through rate and the average click-through rate based on the advertisements placed within the block of positions. In one embodiment, ordinal positions and aggregated ordinal positions are used together for a list. For example, the conversion factors for position one, position two and position three are specific to the corresponding ordinal positions; and conversion factors for position block four to ten and position block above ten are specific for the corresponding position blocks.

Further, the price conversion can be specific for an ordinal position and for a particular category and/or a particular geographic area. Furthermore, the price conversion can be determined from the end-user conversion rates for a specific advertisement at a particular ordinal position (e.g., position three), or a particular aggregated ordinal position (e.g., between positions four and ten).

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:
1. A method, comprising:
transmitting by a server system a plurality of transmissions via a network to end-user devices associated with advertising entities to facilitate a user interface and/or an application programming interface of the server system to prompt specification of information about the advertising entities;
processing by the server system data uploaded from the end-user devices via the network from the end-user devices and storing the data in a database system hosted by the server system, the data comprising respective information about the advertising entities, advertisements respectively associated with the advertising entities, and respective price information for the advertisements respectively associated with the advertising entities, the processing the data the storing data comprising identifying respective communication references for real-time communication connections directed to the advertising entities, and the storing the data comprising respectively associating the respective communication references with the advertising entities to facilitate establishment of real-time communication connections with the advertising entities;
receiving, over a voice communications channel, via an interactive voice response telephony voice portal, a voice communication from a consumer, the voice communication comprising a request for a listing, wherein the voice portal utilizes voice recognition techniques to receive the request, wherein the request corresponds to a first category of service and/or product;
processing the request, by the server system, to determine based at least in part on the request for a listing, a subset of the advertising entities, the determining comprising retrieving a subset of information stored in the database system based at least in part on the request and the first category of service and/or product, the subset of information corresponding to the subset of the advertising entities;

determining, by the server system, an indicator of potential revenue for the first category of service and/or product based at least in part on: tracked data for conversions of advertisements corresponding to the first category; and a subset of the price information for the subset of advertising entities retrieved from the database system based at least in part on merging i) a first type of advertisements that have performance measured based at least in part on a first type of consumer actions as events responsive to the first type of advertisements and ii) a second type of advertisements that have performance measured based at least in part on a second type of consumer actions as events responsive to the second type of advertisements, the subset of the price information including first price information for the first type of advertisements and second price information for the second type of advertisements, wherein:

the first type of consumer actions is different from the second type of consumer actions;

one or both of the first type of consumer actions and the second type of consumer actions corresponds to real-time communications;

the indicator of potential revenue is in terms of price information for advertisements of the first type; and the second price information for the second type of advertisements is converted to equivalent price information for advertisements of the first type according to a conversion factor between price information for the first type of advertisements and the second type of advertisements;

sorting, by the server system, the plurality of entities into an ordered list based at least partially on the indicator of potential revenue for the first category of service and/or product;

presenting, over the voice communications channel, via the voice portal, an advertisement of a top-ranked entity of the ordered list to the consumer, wherein the voice portal utilizes text to speech techniques to present the advertisement to the consumer;

after the presenting the advertisement via the voice portal, processing a selection corresponding to the advertisement, the selection received over the voice communications channel from the consumer; and in response to the selection, initiating by the server system a first real-time communication connection using a first communication reference retrieved from the database system and associated with the top-ranked entity.

2. The method of claim 1, wherein the first type of advertisements are pay per call advertisements and the second type of advertisements are paid call service listings.

3. The method of claim 1, further comprising:

wherein the price information is for the advertisements of the list of entities;

the indicator of potential revenue is partially determined based on likelihood of measurable and chargeable events resulting from the advertisements of the list of entities.

4. The method of claim 3, wherein the first type of advertisement is based on pay per call; and the second type of advertisement is based on paid call service; and the measurable and chargeable event includes:

calls for the first type of advertisement; and money paid for services for the second type of advertisement.

5. The method of claim 1, wherein the price information is for one of services and goods.

6. The method of claim 1, wherein the price information comprises at least one of:

a price for a product;

a price for a service; and a price for the advertisement submitted by one of the bidding advertising entities to sell one of a product and a service.

7. The method of claim 1, wherein the conversion factor is based on a ratio of performance conversion rates between the first type of advertisement and the second type of advertisement.

8. The method of claim 1, wherein the conversion factor is manually specified.

9. The method of claim 1, wherein the indicator of potential revenue is further based on costs for the first type of advertisement and the second type of advertisement.

10. The method of claim 1, wherein the indicator of potential revenue is further based on revenue sharing between a first party and a second party.

11. A tangible non-transitory computer readable medium storing instructions that, when executed by a server system, cause the server system to:

transmit a plurality of transmissions via a network to end-user devices associated with advertising entities to facilitate a user interface and/or an application programming interface of the server system to prompt specification of information about the advertising entities;

process data uploaded from the end-user devices via the network from the end-user devices and store the data in a database system hosted by the server system, the data comprising respective information about the advertising entities, advertisements respectively associated with the advertising entities, and respective price information for the advertisements respectively associated with the advertising entities, the processing the data the storing data comprising identifying respective communication references for real-time communication connections directed to the advertising entities, and the storing the data comprising respectively associating the respective communication references with the advertising entities to facilitate establishment of real-time communication connections with the advertising entities;

receive, over a voice communications channel, via an interactive voice response telephony voice portal, a voice communication from a consumer, the voice communication comprising a request for a listing, wherein the voice portal utilizes voice recognition techniques to receive the request, wherein the request corresponds to a first category of service and/or product;

processing the request to determine, based at least in part on the request for a listing, a subset of the advertising entities, the determining comprising retrieving a subset of information stored in the database system based at least in part on the request and the first category of service and/or product, the subset of information corresponding to the subset of the advertising entities;

determining an indicator of potential revenue for the first category of service and/or product-based at least in part on: tracked data for conversions of advertisements corresponding to the first category; and a subset of the price information for the subset of advertising entities retrieved from the database system and based at least in part on merging i) a first type of advertisements that have performance measured based at least in part on a first type of consumer actions as events responsive to the first type of advertisements and ii) a second type of advertisements that have performance measured based at least in part on a second type of consumer actions as events responsive to the second type of advertisements, the subset of the price information including first price information for the first type of advertisements and second price information for the second type of advertisements, wherein:
the first type of consumer actions is different from the second type of consumer actions;
one or both of the first type of consumer actions and the second type of consumer actions corresponds to real-time communications;
the indicator of potential revenue is in terms of price information for advertisements of the first type; and
the second price information for the second type of advertisements is converted to equivalent price information for advertisements of the first type according to a conversion factor between price information for the first type of advertisements and the second type of advertisements;
sorting the plurality of entities into an ordered list based at least partially on the indicator of potential revenue for the first category of service and/or product;
presenting, over the voice communications channel, via the voice portal, an advertisement of a top-ranked entity of the ordered list to the consumer, wherein the voice portal utilizes text to speech techniques to present the advertisement to the consumer;
after the presenting the advertisement via the voice portal, process a selection corresponding to the advertisement, the selection received over the voice communications channel from the consumer; and
in response to the selection, initiate a first real-time communication connection using a first communication reference retrieved from the database system and associated with the top-ranked entity.

12. A system, comprising:
a server system comprising one or more servers and hosting a database system, the server system further comprising memory coupled to the one or more servers and storing instructions that, when executed by the one or more servers, cause the server system to:
transmit a plurality of transmissions via a network to end-user devices associated with advertising entities to facilitate a user interface and/or an application programming interface of the server system to prompt specification of information about the advertising entities;
process data uploaded from the end-user devices via the network from the end-user devices and store the data in the database system, the data comprising respective information about the advertising entities, advertisements respectively associated with the advertising entities, and respective price information for the advertisements respectively associated with the advertising entities, the processing the data the storing data comprising identifying respective communication references for real-time communication connections directed to the advertising entities, and the storing the data comprising respectively associating the respective communication references with the advertising entities to facilitate establishment of real-time communication connections with the advertising entities;
receive, over a voice communications channel, via an interactive voice response telephony voice portal, a voice communication from a consumer, the voice communication comprising a request for a listing, wherein the voice portal utilizes voice recognition techniques to receive the request, wherein the request corresponds to a first category of service and/or product;
processing the request to determine, based at least in part on the request for a listing, a subset of the advertising entities, the determining comprising retrieving a subset of information stored in the database system based at least in part on the request and the first category of service and/or product, the subset of information corresponding to the subset of the advertising entities;
determine an indicator of potential revenue for the first category of service and/or product-based at least in part on: tracked data for conversions of advertisements corresponding to the first category; and a subset of the price information for the subset of advertising entities retrieved from the database system and based at least in part on merging i) a first type of advertisements that have performance measured based at least in part on a first type of consumer actions as events responsive to the first type of advertisements and ii) a second type of advertisements that have performance measured based at least in part on a second type of consumer actions as events responsive to the second type of advertisements, the subset of the price information including first price information for the first type of advertisements and second price information for the second type of advertisements, wherein:
the first type of consumer actions is different from the second type of consumer actions;
one or both of the first type of consumer actions and the second type of consumer actions corresponds to real-time communications;
the indicator of potential revenue is in terms of price information for advertisements of the first type; and
the second price information for the second type of advertisements is converted to equivalent price information for advertisements of the first type according to a conversion factor between price information for the first type of advertisements and the second type of advertisements;
sort the plurality of entities into an ordered list based at least partially on the indicator of potential revenue for the first category of service and/or product;
present, over the voice communications channel, via the voice portal, an advertisement of a top-ranked entity of the ordered list to the consumer, wherein the voice portal utilizes text to speech techniques to present the advertisement to the consumer;
after the presenting the advertisement via the voice portal, process a selection corresponding to the advertisement, the selection received over the voice communications channel from the consumer; and
in response to the selection, initiate a first real-time communication connection using a first communication reference retrieved from the database system and associated with the top-ranked entity.

* * * * *